(12) United States Patent
Ghosh et al.

(10) Patent No.: US 10,630,728 B2
(45) Date of Patent: Apr. 21, 2020

(54) SYSTEMS AND METHODS FOR MINIMIZING PRIVACY INTRUSION DURING INTERNET OF THINGS LAWFUL INTERCEPTION

(71) Applicant: WIPRO LIMITED, Bangalore (IN)

(72) Inventors: Sudipta Ghosh, Kolkata (IN); Swaminathan Seetharaman, Chennai (IN); Venkata Subramanian Jayaraman, Chennai (IN)

(73) Assignee: Wipro Limited, Bangalore (IN)

( * ) Notice: Subject to any disclaimer, the term of this patent is extended or adjusted under 35 U.S.C. 154(b) by 406 days.

(21) Appl. No.: 15/475,621

(22) Filed: Mar. 31, 2017

(65) Prior Publication Data
US 2018/0288102 A1    Oct. 4, 2018

(51) Int. Cl.
| | | |
|---|---|---|
| *G06F 15/16* | (2006.01) | |
| *H04L 29/06* | (2006.01) | |
| *G06F 21/62* | (2013.01) | |
| *H04W 12/00* | (2009.01) | |
| *H04W 12/02* | (2009.01) | |
| *H04W 4/70* | (2018.01) | |

(52) U.S. Cl.
CPC ........ *H04L 63/306* (2013.01); *G06F 21/6245* (2013.01); *H04W 12/007* (2019.01); *H04W 12/02* (2013.01); *G06F 2221/2111* (2013.01); *H04L 63/308* (2013.01); *H04W 4/70* (2018.02)

(58) Field of Classification Search
CPC .............................. H04W 48/08; H04W 24/08
See application file for complete search history.

(56) References Cited

U.S. PATENT DOCUMENTS

| | | | | |
|---|---|---|---|---|
| 7,558,234 | B2* | 7/2009 | Dommaraju | H04L 43/028 370/328 |
| 9,374,848 | B1* | 6/2016 | Jayaraman | H04M 3/2281 |
| 9,942,825 | B1* | 4/2018 | Narayanan | H04L 63/20 |
| 2004/0185875 | A1* | 9/2004 | Diacakis | H04W 12/02 455/456.3 |
| 2009/0007263 | A1* | 1/2009 | Frenkel | H04M 3/2281 726/22 |

(Continued)

OTHER PUBLICATIONS

Vasilomanolakis, E., et al., "On the Security and Privacy of Internet of Things Architectures and Systems", *IEEE*, 2015. 1 page.

(Continued)

*Primary Examiner* — Umar Cheema
*Assistant Examiner* — Tesfu N Mekonen
(74) *Attorney, Agent, or Firm* — Finnegan, Henderson, Farabow, Garrett & Dunner, LLP

(57) ABSTRACT

This disclosure relates generally to methods and systems for minimizing privacy intrusion during internet of things lawful interception. In one embodiment, a topology of probes system for providing lawful interception information for an internet of things network is provided. The topology of probes system may comprise a super-probe connected to a lawful interception gateway by a set of LI-interfaces and a hierarchy of probes connected to the super-probe. Further, the super-probe and the hierarchy-of-probes may be configured to perform LI operation according to one or more privacy requirement settings and to provide lawful interception information collected by the LI operation. Additionally, the privacy requirement settings may comprise rules that govern at least one of: content-based data exposure, prevention of access of information by predetermined users, and obfuscation of predetermined information.

30 Claims, 13 Drawing Sheets

(56) References Cited

U.S. PATENT DOCUMENTS

| | | | | |
|---|---|---|---|---|
| 2010/0199189 | A1* | 8/2010 | Ben-Aroya | H04L 63/306 715/736 |
| 2011/0270977 | A1* | 11/2011 | Ansiaux | H04L 63/308 709/224 |
| 2012/0096145 | A1* | 4/2012 | Le | G06Q 50/265 709/224 |
| 2012/0163240 | A1* | 6/2012 | Gardell | H04L 63/306 370/259 |
| 2013/0057388 | A1* | 3/2013 | Attanasio | G06Q 50/26 340/10.1 |
| 2013/0121480 | A1* | 5/2013 | Anchan | H04M 3/2281 379/35 |
| 2013/0191354 | A1* | 7/2013 | Wilf | G06F 16/21 707/694 |
| 2015/0049613 | A1* | 2/2015 | D'Amora | H04L 47/11 370/235 |
| 2015/0085670 | A1 | 3/2015 | Myers | |

OTHER PUBLICATIONS

Kumar, J.S., et al., "A Survey on Internet of Things: Security and Privacy Issues", *International Journal of Computer Applications (0975-8887)*, vol. 90, No. 11, Mar. 2014, pp. 20-26.

Ziegeldorf, J.H., et al., "Privacy in the Internet of Things: Threats and Challenges", *Security and Communications Networks 7.12*, 2014, pp. 1-14.

"Internet of things: Privacy and Security in a Connected World", *FTC Staff Report*, Jan. 2015, 71 pages.

Drucker, P.F., "Internet of Things: Position Paper on Standardization for IoT technologies, European Research Cluster on the Internet of Things", *IERC*, Jan. 2015, pp. 1-142.

Levitt, T., "Internet of Things: IoT Governance, Privacy and Security Issues, European Research Cluster on the Internet of Things", *IERC*, Jan. 2015, pp. 1-128.

"Universal Mobile Telecommunications System (UMTS); LTED; 3G Security; Lawful interception requirements (3GPP TS 33.106 version 13.4.0 Release 13)", *ETSI Technical Specification*, Aug. 23, 2016, pp. 1-25.

"Telecommunications security; Lawful Interception (LI); Requirements for network functions" *ETSI*, Jan. 30, 2014, pp. 1-27.

Extended European Search Report issued in the European Patent Office in counterpart European Application No. 17179179.1, dated Dec. 18, 2017, 7 pages.

\* cited by examiner

SYSTEMS AND METHODS FOR MINIMIZING PRIVACY INTRUSION DURING INTERNET OF THINGS LAWFUL INTERCEPTION

TECHNICAL FIELD

This disclosure relates generally to network technologies, and more particularly, to methods and systems for minimizing privacy intrusion during lawful interception for Internet of Things (IoT).

BACKGROUND

With the proliferation of IoT, an ever-increasing number of IoT devices are being connected to a network. The IoT devices may be diverse and heterogeneous. Further, an IoT device may be part of one or more IoT networks (IoTN) at any given instant, may be mobile or stationary, and may be communicating for various purposes.

A number of challenges arise with respect to enabling effective lawful interception (LI) over the IoT networks. For example, LI can be performed for intercepting information transmitted by a Car-IoT network, in order to determine a location of the vehicle, activities performed by a suspect driver, presence of a list of IoT devices connected with the Car-IoT network, etc. Existing LI mechanism for telephone networks (Telco-LI) may provide some of this information. For example, Telco-LI can provide location information based on base station locations and hand-over (HO) activities. However, this is not precise and comes with time-lag. Also, the speed and direction information is likely to be inaccurate.

Moreover, while Telco-LI may provide information on the online activities (call, content, data) in case the activities happen through TelCo infrastructure, the nature of additional devices connected, nature of activities (transaction, etc.) of the suspect and events related to the usage of the Car-IoT including additional devices by the suspect cannot be tracked using TelCo-LI. TelCo-LI also fails to provide other information, such as driving behavior of the driver (speed pattern, route selection, change route, stoppages), activities (ex. fueling, maintenance, accessing traffic information, etc.) performed through the Car-IoT devices, etc.

There are also other attributes of Telco-LI that make it unsuitable for LI for IoT. For example, the nature of tracking for IoT can be very different depending on the nature of the IoT networks, and scope and type of investigation. Hence what is required to be tracked and the information required to be tracked can be quite different for different scenarios. Moreover, the number of devices involved and the amount of content and event information can be very large. Sending such data in original form on a real-time/semi-real-time basis to the LI is likely to impose network resource constraint and may hamper the activities those are being tracked. Also, it is likely to be a constraint on the law enforcement agency (LEA) to process such large data to extract relevant information for investigation for effective LI. Since the nature of information required from different LI probes in IoT network scenario is different in priority and frequency of tracking, the LI would require relevant and related information to be sent based on priority and frequency instead of sending raw information from individual probes. On the other hand, Telco-LI typically has standard LI probes and interfaces in the network, and may not be able to provide the configuration flexibility demanded by different types of IoT networks and devices, and for different scopes and types of investigation Effective LI involving a lawful interception target (LITG) using a IoTN can be performed by a system using probe-topology determined according to a lawful interception specification (LISP) received from a LEA for a specific LI operation. The system generates LI information structural details based on the LISP and can determine LI information source topology and probe-topology based on the generated LI information structure. The system configures LI operation, which can include probe level configuration and probe delegation information based on probe-topology, as well as roles and responsibility assigned to the probes. The configuration of LI operation includes determining LI activation condition for the probes based on the probe-topology, as well as a frequency of LI information processing for each probe in the probe-topology. On fulfillment of LI activation conditions at a probe, the system collects data at the probe and provides the data to LEA in accordance with the received LISP.

A number of challenges arise with respect to preserving privacy of a LITG as well as the privacy of any associated non-LITG during a LI session. The LI session can gather all communication and activities of the LITG and any non-LITG associated with the LITG. Challenges arise in minimizing intrusion into privacy of the LITG as well as that of the non-LITG without compromising effectiveness of the LI.

One privacy challenge during LI in the IoTN is to ensure that the LEA only receives authorized information and nothing more about the LITG user and their associated activities. Referring back to the Car-IoTN example, the tracking information may need to be limited to a specific geographical jurisdiction. Other challenges arise in preserving privacy of a non-LITG user when one or more device(s) of the LITG user join an IoTN of the non-LTG user or when one or more device(s) of the non-LTG user join the IoTN of the LITG user. This can occur if the one or more device(s) leave a previous IoTN to join a new IoTN or if the one or more device(s) join a new IoTN while maintaining existing IoTN membership. The LI in such cases needs to be limited to authorized transaction details about LITG only and un-authorized details (personal, device or network) about the non-LITG user need to be masked from the LEA since there is no justification in probing into the private information of non-LITG users. As an example, a non-LITG passenger may be riding in the Car IoTN example described above and LI needs to exclude any information related to the non-LITG passenger.

The privacy requirements of both LITG and non-LITG users need to be balanced with the requirement of providing all authorized information to the LEA. This gets even more challenging due to variations in legal provisions of LI and privacy in different countries.

Conventional IoTN systems and methods have many limitations in providing privacy preservation mechanisms and minimizing privacy intrusion during LI. Some conventional IoTN systems and methods fail to provide any privacy preservation mechanism under LI, while some others fail to adequately address the privacy of non-LITG users. A few conventional IoTN systems and methods provide privacy by using restricted exposure (such as consent based disclosure, masking of privacy information, etc.) of LITG information to the LEA. However this can hamper the collection of authorized information during a LI session.

SUMMARY

Embodiments of the present disclosure present technological improvements as solutions to one or more of the above-mentioned technical problems in minimizing privacy intrusion during IoT LI. In one embodiment, a method for providing lawful interception information for an internet of things network is provided. The method may be performed by a topology of probes. The method can comprise finalizing an initial specification based on privacy requirement settings and generating a hierarchy of information elements based on the finalized specification. Each of the information elements may include information related to at least one of dependency and reporting requirement. The method may further comprise determining, based on the privacy requirement settings, a set of data sources for providing the reporting information according to the hierarchy of information elements; determining a hierarchy of probes based on the set of the data sources and associated privacy compliance level; configuring the topology of probes based on a set of configurations including privacy; activating LI operation in the topology of probes; performing LI operation by the topology of probes as per set of configurations including privacy; verifying effectiveness of reporting conforming to reporting requirements and privacy compliance. Additionally, the method can comprise taking corrective action and updating learning data in the historical database at the end of LI operation.

In one embodiment, a topology of probes system for providing lawful interception information for an internet of things network is provided. The topology of probes system may comprise a super-probe connected to a lawful interception gateway by a set of LI-interfaces and a hierarchy of probes connected to the super-probe. Further, the super-probe and the hierarchy-of-probes may be configured to perform LI operation according to one or more privacy requirement settings and to provide lawful interception information collected by the LI operation. Additionally, the privacy requirement settings may comprise rules that govern at least one of: content-based data exposure, prevention of access of information by predetermined users, and obfuscation of predetermined information. The privacy requirement settings can be obtained as described below in the description of the method of obtaining relevant privacy requirement settings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments described herein provide methods and systems for minimizing privacy intrusion of LITG and non-LITG users without compromising on the effectiveness of LI in different kinds of IoTN and communication scenarios. This can be achieved by LI specification (LISP) finalization based on feasibility assessment for tracking based on determination of privacy requirements and recommendation of alternate sources of information/alternate information. Further, sources of LI information meeting privacy requirements can be determined for a finalized lawful interception specification (FLISP). Additionally, LI operations meeting privacy requirements can be configured by determining probe topology, configuration, and monitoring and appropriately triggering LI activation to meet privacy requirements. Further, LI operations complying with privacy requirements can be performed by collecting appropriate LI information through the configured probes in an appropriate manner and suitably preparing and delivering the LI information to the LEA. Additionally, effectiveness of both LI operation and privacy preservation can be assessed and corrective steps can be taken in response to any violations or exceptions. The disclosed systems and methods can therefore minimize privacy intrusion during LI in the IoTN. Referring back to the Car IoTN example described above, the disclosed systems and methods can enable effective LI of authorized information while also restricting LEA access to un-authorized information about the LITG and any private information about the non-LITG passenger.

Figure 1:
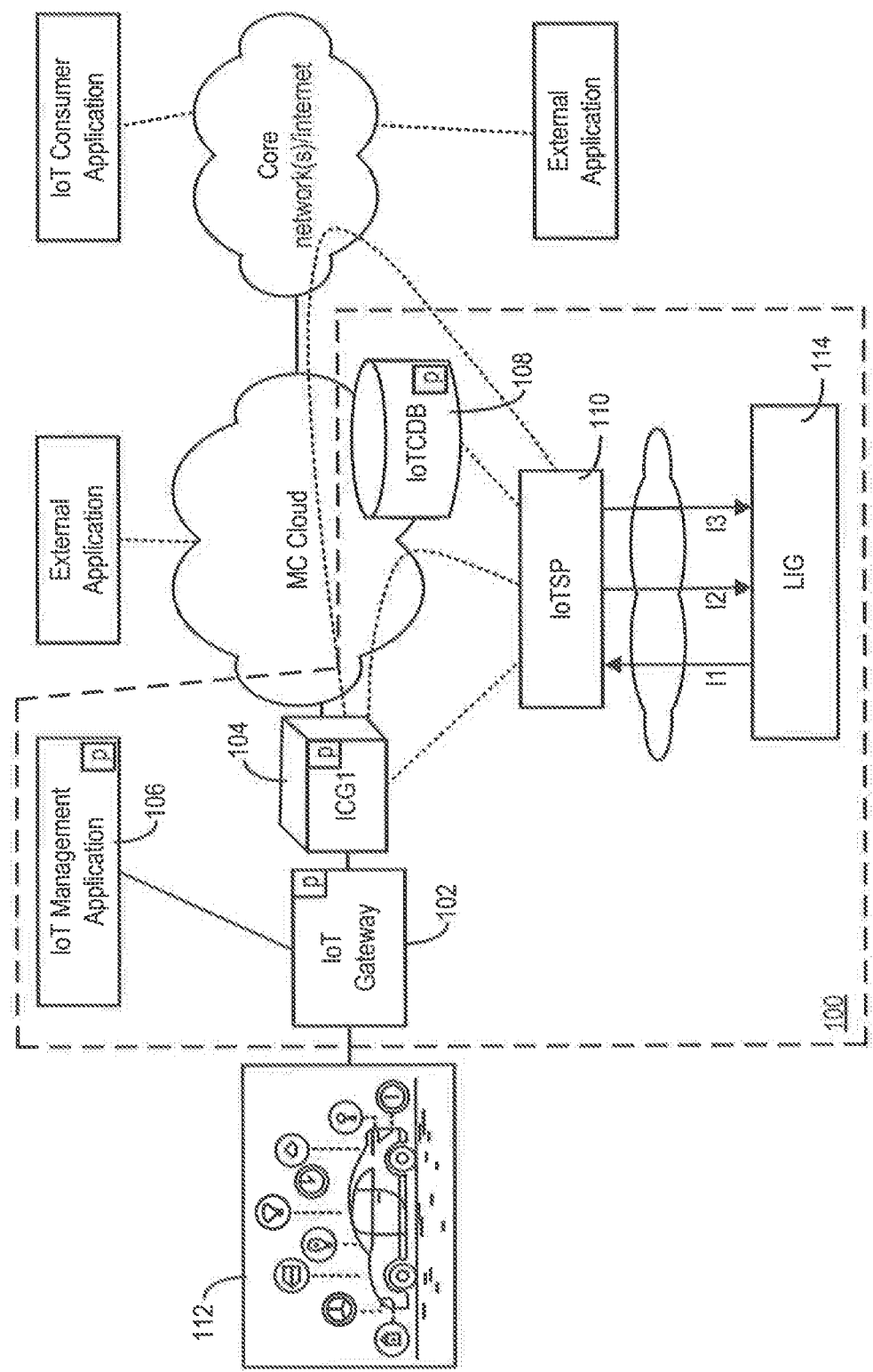
FIG. 1 is a block diagram of an exemplary system for lawful interception, according to embodiments of the present disclosure.

FIG. 1 illustrates an exemplary system 100 for minimizing privacy intrusion during LI in a IoTN, consistent with embodiments of the present disclosure. As shown in FIG. 1, system 100 includes an IoTN topology, which comprises an IoT gateway 102, an interconnect gateway (ICG) 104, an IoT management application 106, an IoT central database (IoTCDB) 108, an IoT superprobe (IoTSP) 110, and a lawful interception gateway (LIG) 114.

IoT gateway 102 and ICG 104 can enable an IoT sub-network (e.g., a network of IoT devices in vehicle 112) to access the core networks/Internet, and to communicate with other devices. In some embodiments, ICG 104 can establish a secure communication interface with IoTSP 110. ICG 104 can host one or more LI probes to provide LI information, and can act as a conduit for establishing a channel between the LI probes plugged it hosts and other probes. IoT management application 106 can maintain a list of IoT devices with access to core networks/Internet, and control IoT gateway 102 to grant or deny access based on the list. IoTCDB 108 can store information such as IoTN topology, identity of the network and devices, IoTN location, current IoT gateway and ICG associated with the IoTN, etc. IoTCDB 108 can be centrally located, or can be composed of a distributed cluster. Each of ICG 104, IoT management application 106, and IoTCDB 108 can also host a LI probe. The LI probes can collect information from these components, and transmit the collected information to IoTSP 110, which can provide the information to LEA through LIG 114. IoTSP 110 can associate the LI information with certain priority as requested by LEA, and LIG 114 can transmit the LI information to LEA according to the requested priority. For the rest of disclosure, it is assumed that LEA and IoTSP 110 communicate only through LIG 114 (or other lawful interception gateway.

LIG 114 can be an entity in a LI administrative domain interacting with various network elements for LI in the IoTN. As shown in FIG. 1, LIG 114 can communicate with IoTSP 110 via multiple interfaces I1, I2, and I3, with different interfaces carrying different types of data.

In some embodiments, interface I1 can be utilized for provisioning of LISP and LI activation/deactivation. During provisioning of LI, LEA/LIG 114 and IoTSP 110 can interact with each other to finalize the LISP taking into account privacy aspects and send the FLISP to IoTSP 110. IoTSP 110 can use the received FLISP to launch the next steps in the LI operation. Interface I1 can be a bi-directional interface during the LISP provisioning stage unlike the X1/HI1 interface used in traditional telecom networks such as public switched telephone network (PSTN) and public land mobile network (PLMN).

In some embodiments, interface I2 can be used for sending of LI information (communication content and events) in real-time/pseudo-real-time on a relatively faster communication interface. The LI information may comprise prepared/processed contents or raw information.

In some embodiments, interface I3 can be used for sending of bulk-LI-information/bulk data (BU-DAT). The BU-DAT can comprise prepared information or raw communication content, sensor data and events.

Internet-of-Things Super-probe (IoTSP)

Figure 2:
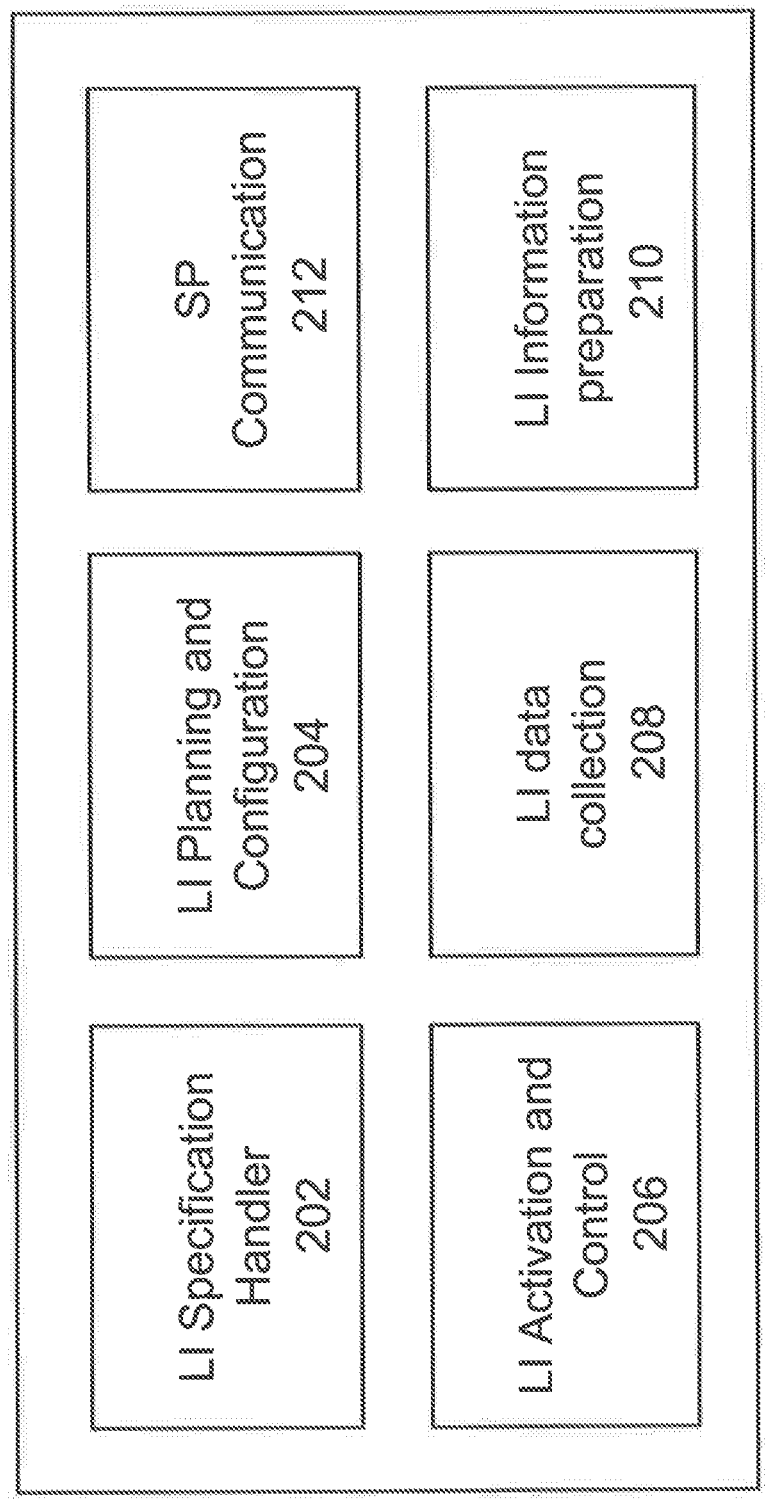
FIG. 2 is a functional block diagram of an exemplary subsystem for lawful interception, according to some embodiments of the present disclosure.

Reference is now made to FIG. 2, which illustrates the exemplary components of Internet-of-things super-probe (IoTSP) 110 of FIG. 1 according to some embodiments of the present disclosure. IoTSP 110 can manage the operations of the LI probes which may be plugged into an IoT gateway 102, interconnect gateway 104, IoT management application 106, or any other network element involved in the IoT communication (e.g., IoT CDB 108), and can transmit the collected information to LIG 114 based on a specification received from LEA.

As shown in FIG. 2, IoTSP 110 includes a lawful interception specification handler (LISH) module 202, a lawful interception planning and configuration (LIPC) module 204, a lawful interception activation and control (LIACTRL) module 206, a lawful interception data collection (LIDC) module 208, a lawful interception information preparation (LIIPREP) module 210, and a superprobe communication (SPCOM) module 212.

For the purposes of this disclosure, "modules" may be implemented in software, hardware, firmware, a mix of any of those, or the like. For example, if the disclosed "modules" are implemented in software, they may be stored in a memory associated with system 700. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

LI Specification Handler (LISH) Module

In some embodiments, LISH module 202 can receive a LISP from LIG 114. The LISP may include information to be tracked about the LITG. As an illustrative example, for tracking a suspect driving a vehicle, the LISP may specify that data related to location and movement of the car-IoT of the vehicle, driving behavior of the driver (e.g., speed pattern, route selection, change route, stoppages, etc.), and activities (e.g., fueling, maintenance, accessing traffic information, etc.) performed through the Car-IoT devices, are to be intercepted and recorded. LISP may also provide additional details about the information to be tracked, such as information-format/structure, events/activity, criticality/importance, priority, frequency of reporting, the processing logic for the information, etc.

LISH module 202 can process the LISP received from LIG 114 to create a list of basic lawful interception information elements (BLIIEs) and send them to LIPC module 204. BLIIEs are basic information elements mapped from the LISP received from LIG 114. The information element mapping can be done only up to one level (IoTSP and its next level). BLIIEs can thus be a basic mapping from the LISP and can be used to determine the feasibility of tracking from a privacy perspective. The BLIIEs may be composed of primary information elements (PLIIEs) as well as dependent information elements (DLIIEs).

Further, LISH module 202 can create a structured tree of lawful interception information elements (LIIE) from the FLISP upon receiving a trigger from LIPC module 204. Each LIIE may include a data structure that stores information related to, for example, details of communication content and/or event (type, format, etc.), priority (relative priority as per the LISP), criticality (pre-defined levels of criticality), frequency of reporting, etc. LISH module 202 may also determine whether there exists any kind of data dependences between the LIIEs, expressed in the form of elementary-LIIE dependency relationships (ELIIEDR). Based on the data dependencies, LISH module 202 can construct an LIIE tree to represent the hierarchical and dependency relationships. As is to be discussed in more detail below, LISH module 202 can provide the LIIE tree to LIPC module 204 for further use. In some embodiments, the LISH module 202 may simply extract the LISP and send it to the LIPC module 204, based on which the LIPC module 204 may create the structured tree of LI Information Elements (LIIE) from the LISP.

The LISP may also include a set of rules for handling certain types of collected data, which can be processed by LISH module 202. For example, the collected data by the LI probes may include bulk-LI-information/bulk data (BU-DAT), which can include prepared information, raw communication content, sensor data and events, etc. Although BU-DAT may be required for legal evidence at a later stage, the volume of BU-DAT is typically very large, which makes it unsuitable to transmit those data in real-time (or semi real-time). Therefore, IoTSP 110 may include dedicated high speed interfaces for real-time (or semi real-time) transmission of some of the LI data, and dedicated low-speed interfaces for slow/deferred transmission of BU-DAT. The LISP may include rules for configuring the interfaces for, for example, the slow/deferred transmission of BU-DAT.

Moreover, the BU-DAT data may also be too voluminous to be permanently stored in IoTSP. Therefore, the LISP may specify information for handling of BU-DAT (BDH). For example, LISP may specify that IoTSP is to store BU-DAT for a specified duration, and to inform LIG to acquire the BU-DAT if storage space is unavailable at IoTSP. LISP may define capacity based recycling of BU-DAT at IoTSP, such as time-stamp based overwriting, storage space allocation policy for different data types, etc. LISH module 202 can extract the BDH information from LISP, and provide that information to LIPC module 204 for further use.

In some embodiments, LISP may also contain a query from the LEA for available options for BDH as supported by IoTSP 110. In that case, LISH module 202 may obtain list of available modes for bulk data handling (AMBDH), and the default mode of BDH (DMBDH) from LIPC module 204. The DMBDH can be provisioned by the operator (e.g., time-stamp based overwriting). LISH module 202 can then transmit the AMBDH information via super-probe communication (SPCOM) module 212 to LIG 114, which in turn can transmit the AMBDH information to LEA. LEA may, in response, transmit a preferred bulk data handling option (LPBDH) to LIG 114, which then forwards the LPBDH to LISH module 202. In case LPBDH was received from LEA, LISH module 202 can update the DMBDH as LPBDH for this particular LISP, and inform LIPC module 204 about the updating of DMBDH.

In some embodiments, LISH module 202 can pass the updated specification from LIG 114 to LIPC module 204 after LIPC module 204 sends a LISP response (LISPR) providing alternate source(s) of information (ASI) to one or more LIIEs.

LI Planning & Configuration Module

In some embodiments, LIPC module 204 can store a set of configuration and performance data, and perform planning and configuration for initiating and managing LI operations as part of IoTSP 110. LIPC module 204 may maintain an IoTSP configuration storage (IoTSPCS) to store a set of probe configuration details (PRODET) about each LI probe being managed by IoTSP 110. The following exemplary table illustrates a set of information that can be included in PRODET:

TABLE 1

| Nature or probe | Capability | Probe past Performance |
|---|---|---|
| Data aggregator | Storage limit | Probe past performance |
| Data processor | Frequency of sampling (FoS) | Past performances of the interfaces of the probes |

TABLE 1-continued

| Nature or probe | Capability | Probe past Performance |
|---|---|---|
| Data collector | Processing logic Interfaces supported, and resources to be allocated for LI operation | |

Probe past performance (PRODET-PASTPERF) data, included as part of PRODET, may also include a set of information related to past performance of the probes, such as a success indicator that indicates a percentage of successful and/or timely deliveries of intercepted information to the next-higher level (upstream) probe in the probe topology. The set of information may also include information indicating a health condition of the probes. As is to be discussed in more details below, these information can be used for assessing the performance of LI probes and for determination of configuration updates to these probes. In some embodiments, the PRODET-PASTPERF can also contain details of privacy exceptions of the probe during LI operation (detected at the probe, next upstream probe (if any), as well as by the IoTSP)—such details include number of exceptions, type of exceptions and severity (along with relevant details).

The health condition information may include, for example, durations in which the probe was operational or out-of-service, stability of operation (e.g., how often the probe toggles between being operational and being out-of-service, security and resource constrains. In some embodiments, PRODET-PASTPERF can include trend information as well as the average (weighted, simple, etc.) of a set of operational parameters of the probe, such as success rate of event processing (H-PR-SUCC-EVT-PROC), success rate of content processing (H-PR-SUCC-CONT-PROC), success in aggregation (H-PR-SUCC-AGGREG), success rate of information delivery (H-PR-SUCC-INFO-DELIV), success rate of timely information delivery (H-PR-SUCC-TIMELY-DELIV), exception conditions encountered (which may include a type and a frequency for handling different exception types) (H-PR-EXCEP-COUNT), success rate of handling of exception conditions (H-PR-EXCEP-HANDLED), and effectiveness (H-PR-EFFECTIVENESS).

LIPC module 204 may also store, in IoTSPCS, past performance information of IoTSP 110 (IoTSP-PAST-PERF). The performance may be related to the LI information processing and delivery by IoTSP 110 to LIG 114. In some embodiments, IoTSP-PAST-PERF may also include trend information as well as the average (weighted, simple, etc.) of a set of operational parameters including success rate of delivery to LIG (I-H-IoTSP-SUCC-INFO-DELIV), success rate of timely delivery to LIG (H-IoTSP-SUCC-TIMELY-DELIV), exception conditions encountered (H-IoT-EXCEP-COUNT), success rate of handling of exception conditions (H-IoTSP-EXCEP-HANDLED), and effectiveness (H-IoTSP-EFFECTIVENESS).

LIPC module 204 may also store other information, including thresholds for diagnosis of the LI operations, as well as bulk data handling information, such as AMBDH and DMBDH, in the IoTSPCS.

In some embodiments, data stored by LIPC module 204 in IoTSPCS can include Alternate sources of information (ASI) along with the details of the type of investigation. Additionally, data may be stored indicating effectiveness of LI operation as the percentage of LEA requirements fulfilled after considering the privacy restrictions (only dips in percentage due to privacy restrictions may be considered). In some embodiments, the stored data can also include past digital presence (PAST-DP), privacy policy, privacy considerations at network level, privacy settings based on user group, location, IoT network type, function, privacy policy of the operator/regulations, etc., and thresholds related to privacy compliance (which may include thresholds for privacy-compliance-factor (PCF), weighted product of exception (per exception type as well as default), etc.).

LIPC module 204 may also perform a set of planning functions. For example, LIPC module 204 can create BLIIE structure (BLIIE-STRUCT) and for each BLIIE, can update it with feasibility status, ASI (if any). BLIIE-STRUCT can be composed of the following information elements—information type, possible information source(s), feasibility status of reporting the information (feasible, partly feasible, or infeasible due to privacy restrictions), and ASI.

In some embodiments, LIPC module 204 can initially determine ASI based on pre-configured inputs and later during LI operation based on learning from updated LISP and FLISP. Some examples of ASI are where location information cannot be shared, however, places visited can be shared, or location of user cannot be shared, however, smartphone location can be shared, or emotional state of a car-IoT user cannot be shared, however, driving patterns can be shared while in the car.

LIPC module 204 can also determine PAST-DP data of the LITG from the IoTSPCS and if required can obtain it from IoTCDB. In case there is no sufficient PAST-DP information in the IoTCDB (for example, a new LITG user), LIPC module 204 can prepare the PAST-DP data based on pre-configured inputs, current location of the LITG user, mobility, IoT networks and devices belonging to the LITG user, function of the IoT network and IoT devices, etc. For a Car-IoT example, this can be all neighboring areas, all gas stations in the vicinity of the Car-IoT, etc.

In some embodiments, LIPC module 204 can negotiate with the LEA on what can be tracked and reported to the LEA taking into account the privacy considerations. In order to enable this, LIPC module 204 can determine feasibility of tracking and ASI as explained above, and update the BLIIE-STRUCT. LIPC module 204 can use the BLIIE-STRUCT to prepare and send the LISPR to the LEA over I1 interface (via LISH module 202 and SPCOM module 212). The LISPR can contain the LISP which may be extended to contain the following details for each piece of information that was requested to be reported by the LEA—feasibility status (FE_STAT) of reporting the information due to privacy restrictions (FE_STAT could be zero (infeasible/INFEAS), one (partially feasible/PART_FEAS) or two (feasible/FEAS)), details of what can be reported for the information elements in the LISP for which reporting feasibility status is 'partly feasible,' and ASI (if any) containing the details of what will be reported as an alternative to what was requested for the information elements in the LISP for which reporting feasibility status is 'partly feasible'. If more than one option (for ASI) exists, then all such options and associated details can be included for the LEA to be able to decide the most appropriate option.

Figure 3:
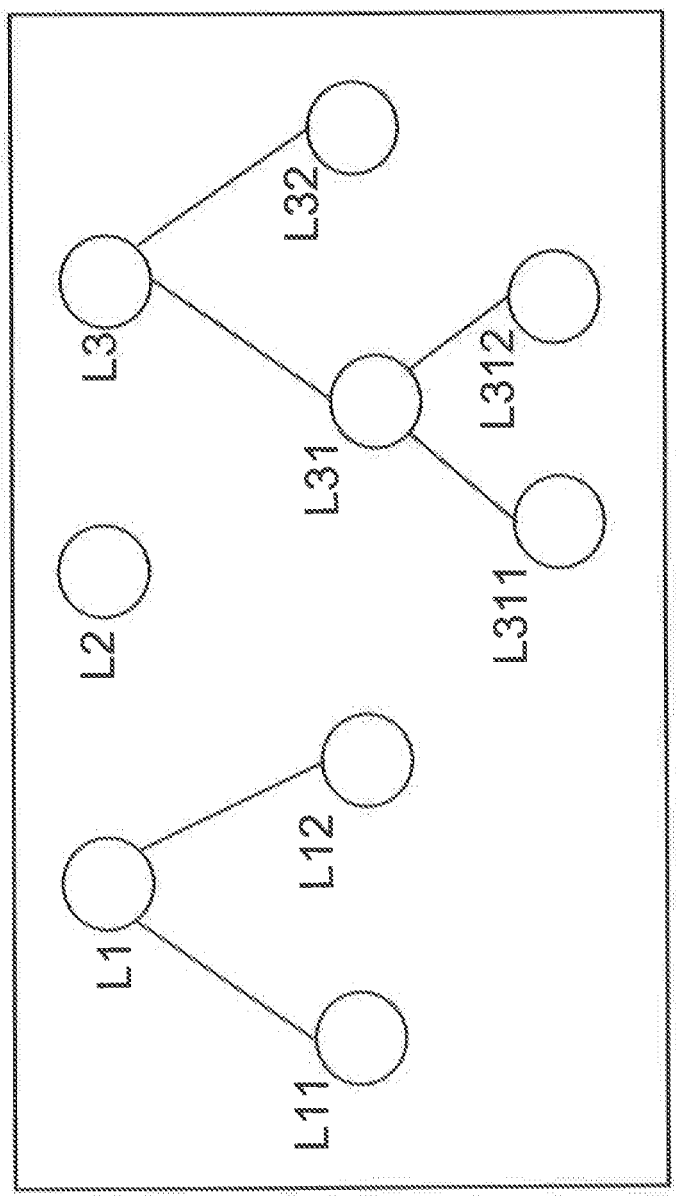
FIG. 3 is a diagram illustrating an exemplary information element hierarchy according to some embodiments of the present disclosure.

In some embodiments, LIPC module 204 may create an LI information structure comprising a number of LIIE (LI information elements) based on data dependences between the LIIEs provided by LISH module 202, as well as pre-configured information and inputs received in the LISP. An example of such a LI information hierarchy is shown in FIG. 3. Referring to FIG. 3, LIIEs labelled L1, L2, and L3 can be primary LIIEs (PLIIE), and LIIEs labelled L11, L12, L31, L32, L311, and L312 can be underlying LIIEs (ULIIE). The hierarchy can be determined based on elementary-LIIE dependency relationships (ELIIEDR). ELIIEDR may include pre-configured information and inputs received in the LISP.

As part of the planning functions, LIPC module 204 may also determine information source identification and mapping, by which LIPC module 204 determines the information mapping and processing logic to prepare each LIIE by the concerned probe, as well as to LIIPREP module 210, in the IoTSP. Moreover, LIPC module 204 may also create an LI-probe-topology (LI-PROTOP) for a specific LI operation. The creation of LI-PROTOP can be based on, for example, probes selected for each LIIE, as well as the LIIE hierarchy such as the one shown in FIG. 3. As is to be discussed in more detail below, LI-PROTOP can be used to determine the LI information preparing node (IPN), probe configuration details (Probe-CD), probe delegation Information (Probe-DI), LI activation conditions (LIAC), etc. IPN aggregates the information from downstream nodes for preparing the PLIIE/DLIIE, and then prepares and sends the PLIIE/DLIIE to either an upstream probe, or to LEA. LIAC defines the conditions for activing an LI operation in a probe (or IoTSP).

Figure 4A:
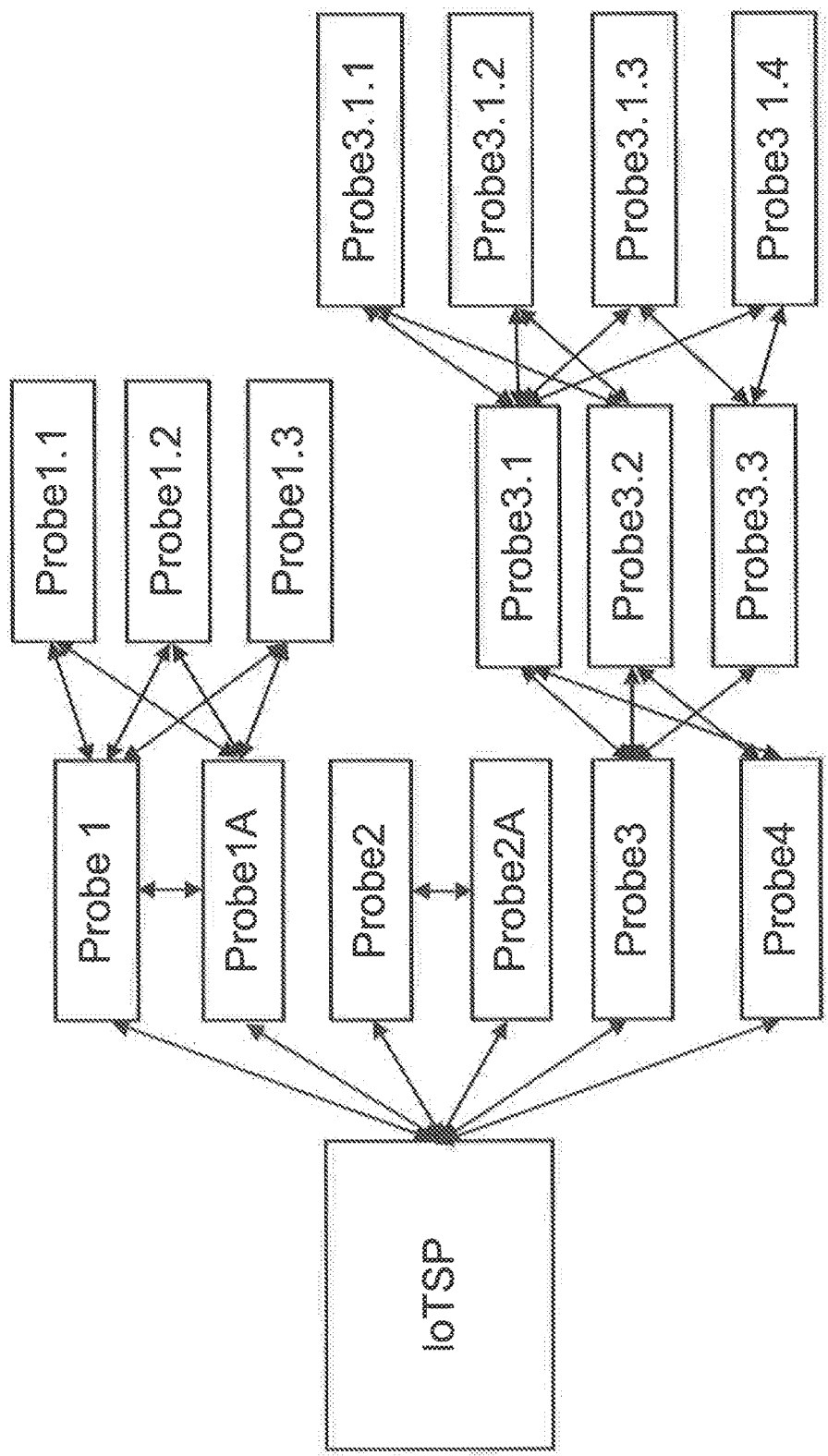
FIGS. 4A-4B are diagrams illustrating exemplary data representing an exemplary probe hierarchy according to some embodiments of the present disclosure.

An example of LI-PROTOP is shown in FIG. 4A. As shown in FIG. 4A, Probes 1A, 2A and 5 can be fallback probes having an interface to the IoTSP. Probe 1 can be an upstream probe of probes 1.1 and 1.2, and probes 1.1 and 1.2 can be downstream probes of probe 1. There can be a 1:n relationship between an upstream probe and a downstream probe, i.e., a downstream probe can have only one immediately upstream probe under normal conditions.

Probe configuration details (Probe-CD) may include configuration details of each probe, and can include information including, for example, LIIEs to be provided by the probe. For each LIIE to be provided the probe, Probe-CD may further include a set of configuration information, such as frequency of sampling (FoS), frequency of reporting (FoR), processing logic for that LIIE (LIIE-PL), information preparing node (IPN), LI activation condition (LIAC), indication whether the probe is a primary probe or a fallback probe, etc. The set of configuration information may also include dependency information for LIIEs (e.g., based on LI-PROTOP), downstream probes information that provide the dependent LIIE data, etc. Further, the configuration information may also include the priority and criticality of each LIIE to be provided by the probe.

Probe-CD may also include a set of configurations based on past performance data (PRODET-PASTPERF) of the probe. For example, Probe-CD may include a scaling factor for the probe LI data processing timer (SCF_FOIP-_TIMER), which can be determined based on relevant parameters in PRODET-PASTPERF. Such a scaling factor can be inversely proportional to, for example, the parameter denoting the success rate in timely delivery of LI information by the probe to the next-level upstream probe or to the IoTSP, in order to allocate more processing time and resources for a probe that has a lower success rate of timely delivery of LI information.

Probe-CD may also include a recommended list of interfaces for LIIE data transmission for the high priority and/or highly critical LIIEs, based on PRODET-PASTPERF. As discussed above, PRODET-PASTPERF may store data related to past performance of probe interfaces. Hence the recommended interfaces based on PRODET-PASTPERF aid the probe to have good performance during the LI operation.

Figure 4B:
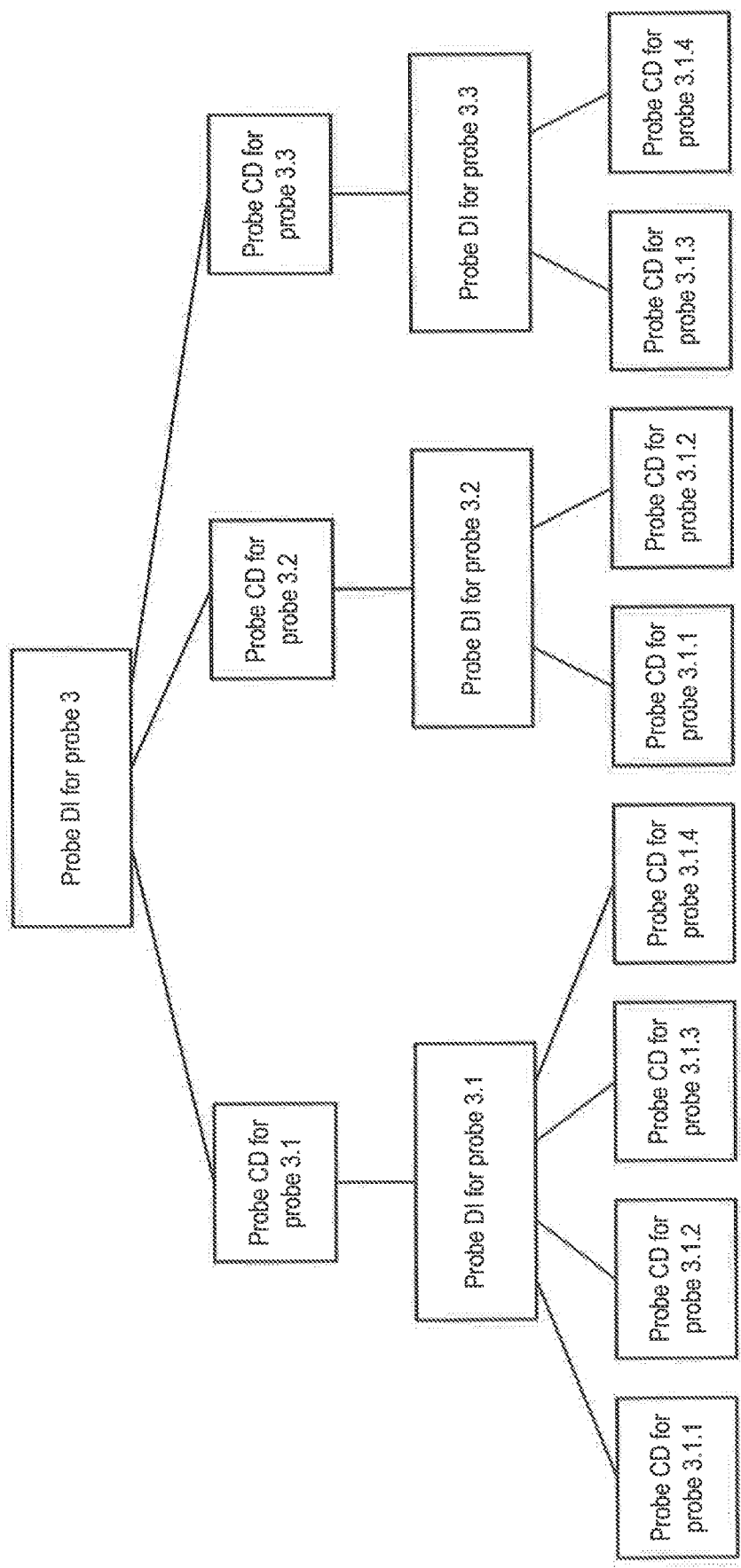

Probe delegation information (Probe-DI) may store a hierarchy structure of Probe-CDs (and Probe-DIs) based on the probe hierarchy. FIG. 4B illustrates an exemplary Probe-DI structure for probe 3 of FIG. 4A. In the case of multiple upstream probes for a single downstream probe for the same LIIE, the primary upstream probe (out of the multiple upstream probes) may perform the configuration of the downstream probe. For example, as shown in FIG. 4A, if probe 3.1 is the primary upstream probe for LIIEs to be collected from downstream probes 3.1.1, 3.1.2, 3.1.3, and 3.1.4, then probe 3.1 can be assigned to configure these downstream probes.

Based on Probe-CD and Probe-DI information, all the probes in the LI-PROTOP hierarchy can be configured in a step by step manner, starting from the IoTSP and propagating to the end downstream probes.

As part of the planning functions, LIPC module 204 may also identify possible sources of information (e.g., possible probe(s)) for each information item listed in each LIIE based on, for example, criticality, priority, FoR and FoS listed in the PRODET (probe configuration details) for these probes). LIPC module 204 may also associate each LIE with criticality, priority, FoR, and FoS information, and store these information in an information source mapping table (ISMT). The following is an example of an ISMT table that associates the LIIEs in FIG. 3 with the probes in FIG. 4B:

TABLE 2

| PLIIE/ ULIIE | Possible Information sources | LIIE-PL | Criti-cality | Prior-ity | FoS (per minute) | FoR (per minute) |
|---|---|---|---|---|---|---|
| L1 | Probes 1, 1A | PL1 | High | P1 | 6 | 6 |
| L11 | Probes 1.1, 1.2, 1.3 | PL11 | High | P1 | 36 | 6 |
| L12 | Probes 1.2, 1.3 | PL12 | High | P1 | 18 | 9 |
| L2 | Probes 2, 2A | NA | High | P3 | 4 | 4 |
| L3 | Probes 3, 4 | PL3 | Medium | P2 | 30 | 3 |
| L31 | Probes 3.1, 3.2 | PL31 | High | P2 | 12 | 3 |
| L311 | Probes 3.1.1, 3.1.3 | PL311 | High | P2 | 3 | 3 |
| L312 | Probes 3.1.2, 3.1.3, 3.1.4 | PL312 | High | P2 | 5 | 5 |
| L32 | Probes 3.2, 3.3 | PL32 | Low | P2 | 14 | 7 |

Figure 5:
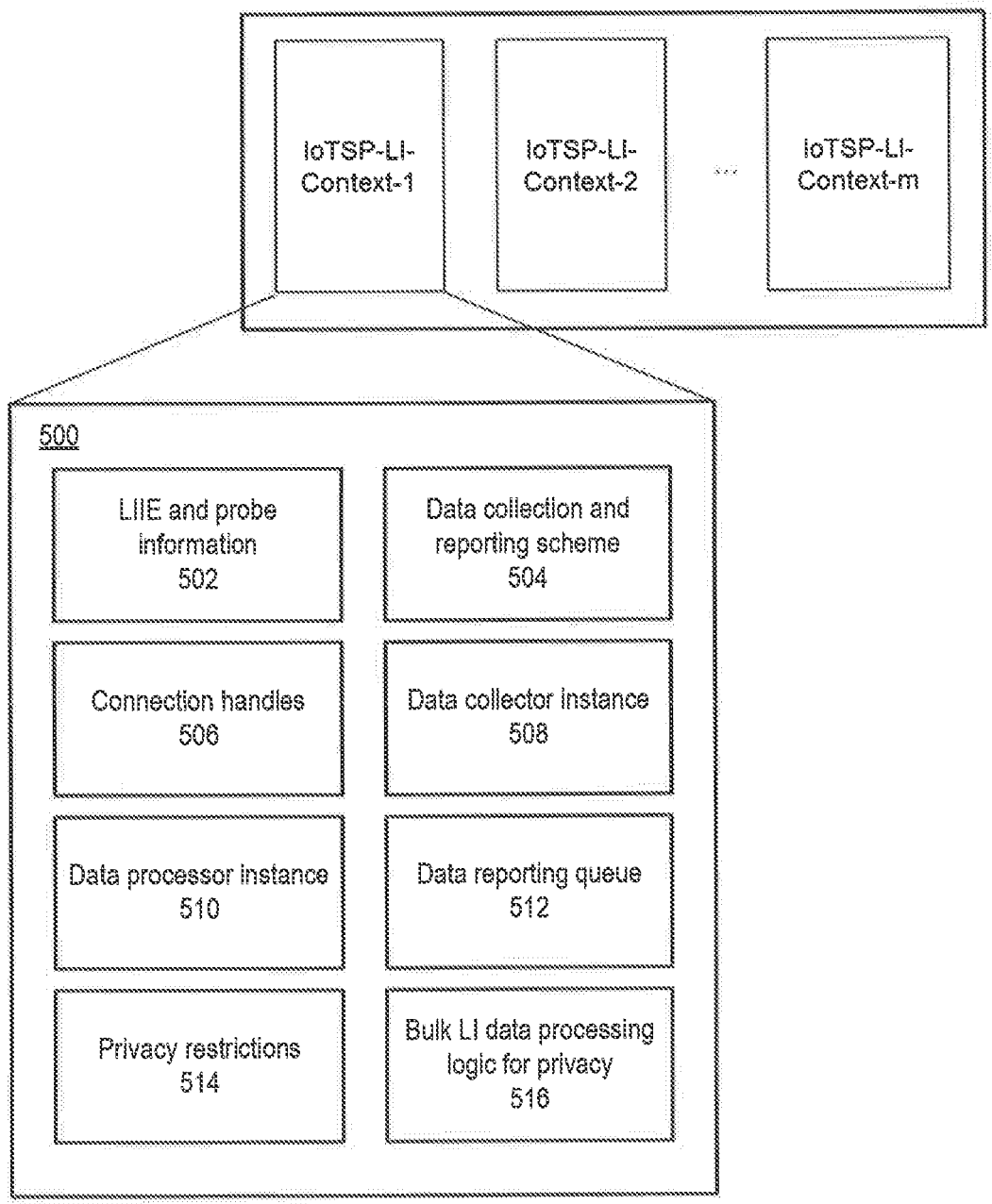
FIG. 5 is a diagram illustrating an exemplary data structure for storing operation data according to some embodiments of the present disclosure.

Based on ISMT, LIPC module 204 may also select the probes (primary and secondary/fallback probes) for each information item listed in LIIE, and store the information in an appropriate information source mapping table (AISMT). AISMT also include other information, such as information preparing node (IPN) for each probe, LI activation condition (LIAC), etc. An example of AISMT based on FIGS. 3 and 4A can be as follows:

After the planning functions are performed (e.g., formation of probe topology, assigning roles and responsibilities to probes, update of AISMT, etc.), LIPC module 204 may generate an IoTSP-LI-Context (I-LIC) for a particular LISP. I-LIC can be a data structure that keeps a record of the LI operation information, at IoTSP 110, for a particular LISP. LIPC module 204 can create multiple I-LICs for different LISPs. FIG. 5 illustrates an exemplary I-LIC 500. As shown in FIG. 5, I-LIC 500 includes LIIE and probe information 502, data collection and reporting scheme 504, connection handles 506, data collector instance 508, data processor instance 510, data reporting queue 512, privacy restrictions 514, and bulk LI data processing logic for privacy 516 (to comply with privacy requirements).

LIIE and probe information 502 may include, for example, LIIE hierarchy and dependencies (e.g., as shown in FIG. 3), probe topology (e.g., as shown in FIG. 4A), Probe-CDs for each probe in the probe topology, ISMT and AISMT tables, etc. Data collection and reporting scheme 504 may include, for example, the set of data to be collected based on the LIIE structure, information related to FoR, FoS, priority and criticality of the set of LI information, frequency of LI information processing (FOIP) and LI information processing timer (LIIP_TIMER), as well as bulk data handling method (DMBDH) according to LISP. Connection handles 506 may specify a set of interfaces at IoTSP for performing the LI operation based on the received LISP. The set of interfaces may include interfaces for upstream (towards LIG 114) connections and interfaces for downstream (towards next level probes in the probe topology). Data collector instance 508 can be linkage (e.g., handles) to computing resources (for that specific LI operation or LISP) associated with the set of data specified in data collection and reporting scheme 504 and the set of interfaces specified in connection handles 506. Data processor instance 510 can be linkage (e.g., handles) to computing resources for processing of collected data by the probes for the specific LI operation, and may include the processing logics (PL) specified in the LISP. Data reporting queue 512 can be a linkage to a reporting queue that is specific to an LI-operation. The reporting queue can store LI information that has been processed by the processing unit referenced by data processor instance 510 and waiting for to be transmitted to LIG 114.

Different parts of I-LIC can be accessed by different modules in IoTSP 110. For example, LI data collection (LIDC) module 208 can access the information stored in data collection and reporting scheme 504 and data collector instances 508. LI information preparation (LIIPREP) module 210 can access data processor instances 540 and data reporting queue 512. Communication module 212 can also

TABLE 3

| PLIIE/ ULIIE | Probes | | IPN | LIIE-PL | Criti-cality | Prior-ity | FoS (per min) | FoR (per min) | LIAC |
| | Primary | Fallback | | | | | | | |
|---|---|---|---|---|---|---|---|---|---|
| L1 | 1 | 1A | IoTSP | PL1 | High | P1 | 6 | 6 | C1 |
| L11 | 1.1 | 1.2 | 1 | PL11 | High | P1 | 36 | 6 | C11 |
| L12 | 1.2 | 1.3 | 1 | PL12 | High | P1 | 18 | 9 | C12 |
| L2 | 2 | 2A | IoTSP | PL2 | High | P2 | 4 | 4 | C2 |
| L3 | 3 | 4 | IoTSP | PL3 | Medium | P3 | 30 | 3 | C3 |
| L31 | 3.1 | 3.2 | 3 | PL31 | High | P2 | 12 | 3 | C31 |
| L311 | 3.1.1 | 3.1.3 | 3.1 | PL311 | High | P1 | 3 | 3 | C311 |
| L312 | 3.1.2 | 3.1.4 | 3.1 | PL312 | High | P3 | 5 | 5 | C312 |
| L32 | 3.3 | | 3.3 | PL32 | Low | P1 | 14 | 7 | C32 | obtain the LI information stored in data reporting queue 512 for all active l-LICs, and may insert the LI information into a set of common queues, each of which corresponds to a particular communication interface to LIG 114. I-LIC undergoes modification whenever there is an update in at least one of ISMT, AISMT, probe topology or Connection Handles.

As part of the configuration functions, LIPC module 204 may also configure the probes and IoTSP 110 in various aspects including, for example, information to be collected, prepared (processed), reported, schedule for delivery, LI activation condition, etc. The configurations may include assigning probe-specific roles and responsibilities for data collection, sequencing of information, sending the information with the specified priority, ensuring criticality needs are met, and delegating the configuration of probes based on the probe DI hierarchy, such as the one shown in FIG. 4B. The configuration may further include privacy-related aspects for data collection, event tracking, data preparation and reporting, and during reporting of LI activation condition fulfillment. LIPC module 204 may also set the bulk data handling (BDH) method in the LIDC of IoTSP based on BDH information received from LISH module 202. LIPC module 204 can also configure appropriate interfaces (primary and backup) as I2 for sending (pseudo) real-time prepared and raw data (LIIEs), and appropriate interfaces (primary and backup) as I3 for slow/deferred sending of the BU-DAT.

LI Activation & Control Module

LIACTRL module 206 can perform LI activation/deactivation in the selected probe(s). In some embodiments, LIACTRL module 206 can perform probe monitoring and control, i.e., ensuring that the LI information is reported at the specified frequency, specified priority, etc. by each of the probes. In case of any exceptions, LIACTRL module 206 can trigger the probe fault tolerance function. Probe fault tolerance may include taking appropriate actions upon encountering an event/trigger that requires actions such as (re)selection of a new probe, changing the communication channel, changing the security mechanism, etc. Such event/triggers can also include privacy exceptions encountered during the LI operation.

LI Data Collection Module

In some embodiments, the LIDC module 208 can collect LI information from multiple probes and can use the fault tolerance mechanism to ensure collection even under adverse conditions and/or exceptions. LIDC module 208 can also store the BU-DAT LI information for sending it to LIG 114 over the I3 interface (via SPCOM module 212), based on bulk data handling (DMBDH) information extracted from LISP.

LIDC module 208 may also collect and store diagnostics information based on LI information that flows through IoTSP 110 (IoTSP-PR-DIAG-INFO). IoTSP-PR-DIAG-INFO may include information including, for example, success rate of delivery to LIG 114 (IoTSP-SUCC-INFO-DELIV), success rate of timely delivery to LIG 114 (IoTSP-SUCC-TIMELY-DELIV), the exception conditions encountered (e.g., type and frequency for different exception types, details about interface failure, etc.) (IoT-EXCEP-COUNT), and success rate of handling of different types of exception condition (IoTSP-EXCEP-HANDLED).

LIDC module 208 may also receive, from each probe, probe diagnostics information (PR-DIAG-INFO) that are generated locally at the probes. PR-DIAG-INFO may include information related to, for example, exceptions arising out of issues like security, resource constraint, downtime (e.g., duration for which a particular resource(s) was out of service), exception handling status (e.g., whether the exception has been handled successfully or not); success rate of receipt of information from downstream probe(s); success rate of timely receipt of information from downstream probe(s), etc. PR-DIAG-INFO may also include information such as, for example, rate of success in event processing (PR-SUCC-EVT-PROC), rate of success of content processing (PR-SUCC-CONT-PROC), rate of success of aggregation (PR-SUCC-AGGREG), rate of success of information delivery (PR-SUCC-INFO-DELIV), rate of success in timely information delivery (PR-SUCC-TIMELY-DELIV), exception conditions encountered (Type and frequency for different exception types) (PR-EXCEP-COUNT), rate of success of handling of different types of exception conditions (PR-EXCEP-HANDLED), etc.

LIDC module 208 can also collect probe diagnostics information locally for each probe (IoTSP-PR-DIAG-INFO). IoTSP-PR-DIAG-INFO may contain diagnostics related to privacy aspects, for example, information such as number, type and severity of privacy exceptions encountered, details of additional information reported from each probe, and details of incomplete information reported from each probe.

In some embodiments, LIDC module 208 can receive the PR-DIAG-INFO from each probe. LIDC module 208 can also, upon receiving the default mode of BDH LISP (DMBDH-LISP) from LIPC module 204, take appropriate steps to collect and transfer BU-DAT to LIG 114 (via SPCOM module 212). If any processing of the bulk LI information is required due to privacy restrictions, LIDC module 208 can trigger the LIIPREP module 210 accordingly.

LI Information Preparation Module

LIIPREP module 210 can process the collected LI information as per prior-mapping and processing-logic. LIIPREP module 210 can also determine the frequency of LI information processing (FOIP) by taking consideration the FoR of all primary LIIEs (PLIIEs), and process the collected LI information based on the determined FOIP. The FOIP can be determined based on, for example, the lowest common multiple (LCM) of FoRs of all PLIIEs. LIIPREP can also activate the data processor instance linked to the IoTSP-LI-Context (I-LIC) for the LI operation. LIIPREP module 210 can also process the bulk LI data to ensure compliance to privacy requirements if required. In some embodiments, LIIPREP module 210 can, when triggered by LIDC module 208, process bulk LI data based on the configured privacy settings.

Super-probe Communication Module

Super-probe communication module (SPCOM) 212 may provide a number of interfaces for the communication between IoTSP 110 and LIG 114. For example, as discussed above with respect to FIG. 1, IoTSP 110 may communicate with LIG 114 via an interface I1, an interface I2, and an interface I3. In some embodiments, SPCOM module 212 can obtain LISP and any instructions from LEA (via LIG 114), and can pass information from IoTSP 110 to LEA (via LIG 114). SPCOM module 212 can also schedule delivery of LI information according to the priority specified by the LEA. In some embodiments, SPCOM module 212 can select interface for LI content delivery to LEA (via LIG 114). SPCOM module 212 can also securely deliver LI information to LEA (via LIG 114). In some embodiments, SPCOM module 212 can enable bi-directional communication with IoT infrastructure including the probes.

Lawful Interception Probe

Figure 6:
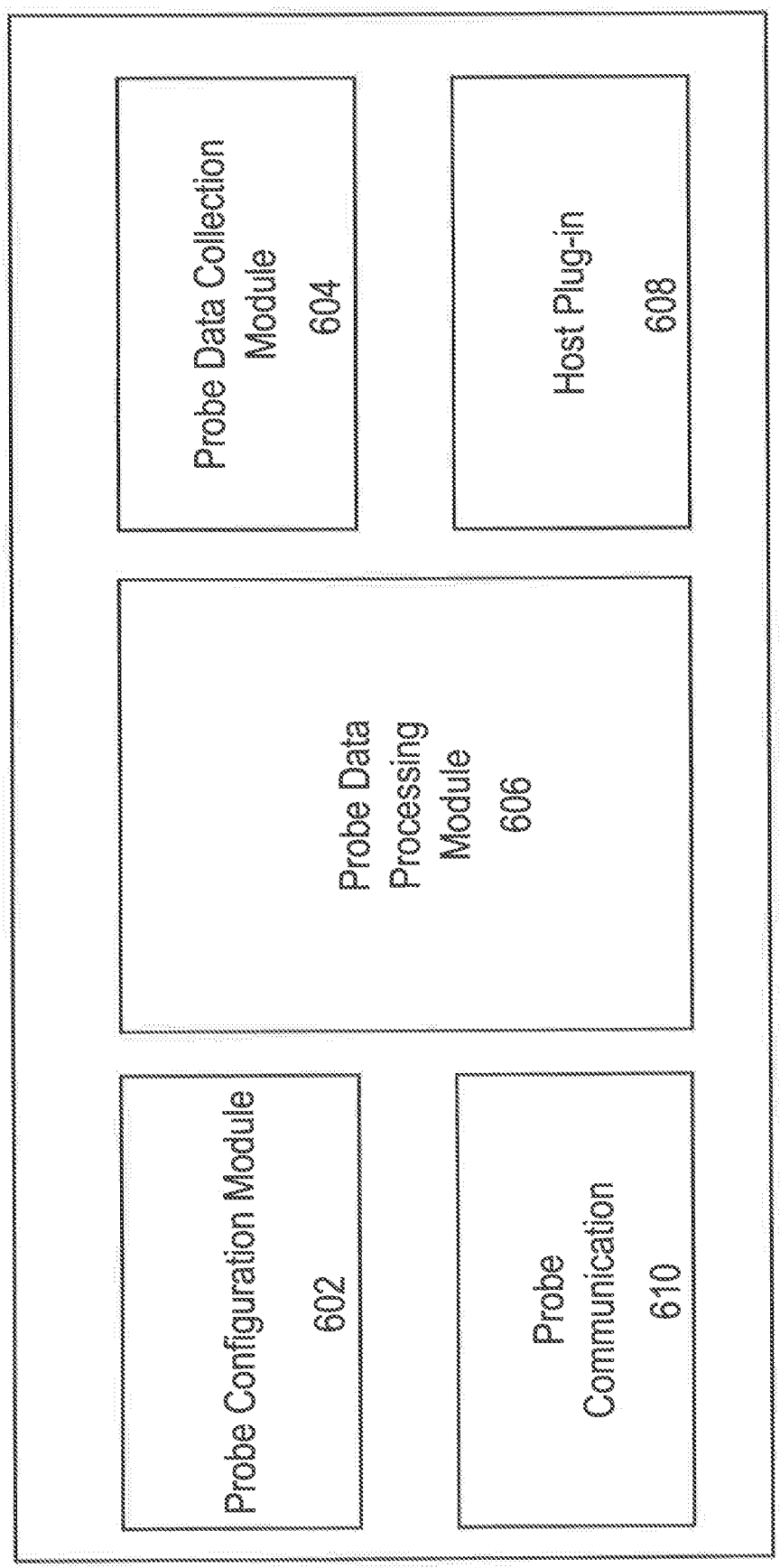
FIG. 6 is a functional block diagram of an exemplary subsystem for lawful interception, according to some embodiments of the present disclosure.

Reference is now made to FIG. 6, which illustrates an exemplary LI probe 400 according to embodiments of the present disclosure. As discussed above, a LI probe can be hosted in various components shown in FIG. 1, such as IoT gateway 102, ICG 104, IoT management application 106, etc. As shown in FIG. 6, LI probe 600 may include a probe configuration module (PRCFM) 602, a probe data collection (PRDC) module 604, a probe data processing (PRDP) module 606, a host plug-in (HPIN) module 608, and a probe communication (PRCOM) module 610.

Probe Configuration Module

In some embodiments, probe configuration module (PRCFM) 602 can configure a probe for LI information collection (from the local host). The configuration may include, for example, information to collect, frequency of information collection, criticality, privacy requirement settings, etc., as well as setting for reporting (e.g., via a predetermined interface). PRCFM 602 may also pass the configuration instructions and delegation information (Probe-CD and Probe-DI) to probes that are downstream and have to be configured to send the LI information to the probe, which can be an upstream probe. PRCFM 602 may also determine and perform other configurations, such as the times at which the collected information is to be processed and formatted into LI information, and the times at which the processed LI information is to be transmitted. These configurations can be determined based on, for example, the information to be collected from this probe, as well as from other downstream probes, as well as their priority as specified by the LEA (e.g., based on information extracted from LISP) which is transmitted to the probe as part of the Probe-CD contents.

In some embodiments, PRCFM 402 can configure the LI information preparation steps including privacy-related actions, for example, masking of certain information fields, etc. This can also include privacy-related processing of bulk LI data before sending it further upstream.

Figure 7:
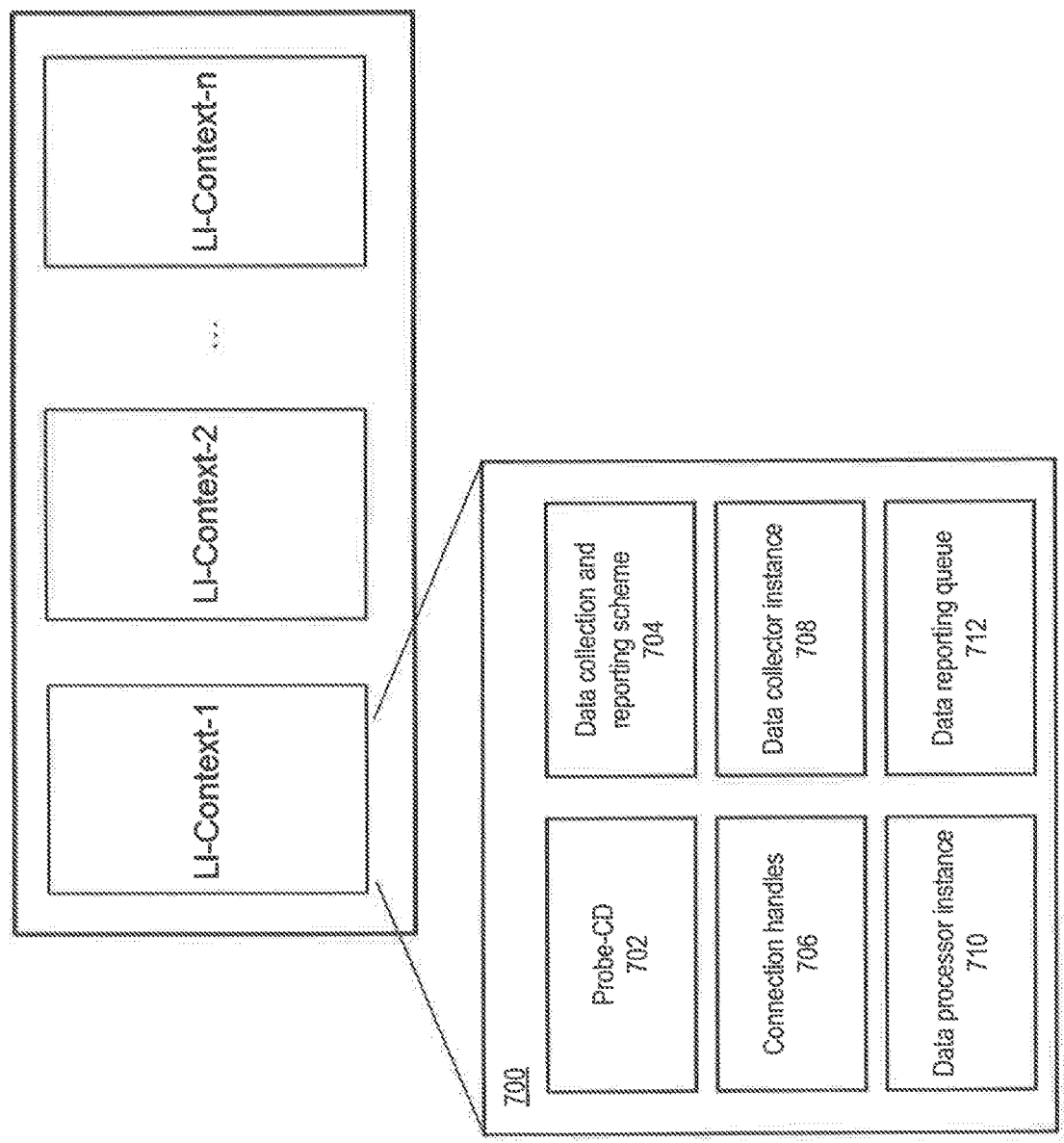
FIG. 7 is a diagram illustrating an exemplary data structure for storing operation data according to some embodiments of the present disclosure.

In some embodiments, PRCFM 602 may also create a probe-LI-context (PR-LIC) for a specific LI operation that corresponds to an LISP. PR-LIC can be a data structure that keeps a record of the LI operation information, at a probe and for a particular LISP. PRCFM module 602 can create multiple PR-LICs for different LISPs. FIG. 7 illustrates an exemplary PR-LIC 700. As shown in FIG. 7, PR-LIC 700 includes Probe-CD 702, data collection and reporting scheme 704, connection handles 706, data collector instance 708, data processor instance 710, and data reporting queue 712.

Probe-CD 702 can be a Probe-CD received from upstream probes, or from IoTSP 110. Data collection and reporting scheme 704 can include, for example, the set of data to be collected as specified in Probe-CD (which is based on the LIIE structure), information related to FoR, FoS, priority and criticality of the set of LI information, frequency of LI information processing in the probe (PROBE_FOIP) and LI information processing timer (LI-PROBE-IP-TIMER), etc. Connection handles 706 may specify a set of interfaces at the probe for connection with upstream and/or downstream probes. Data collector instance 708 can be a linkage (e.g., handle) to processing unit (computing resources) associated with the set of data specified in data collection and reporting scheme 704 and the set of interfaces specified in connection handles 706 for the specific LI operation (corresponding to an LISP). Data processor instance 710 can be a linkage (e.g., handle) to processing unit for processing of collected data by the probe for the specific LI operation, and may include the processing logics (PL) specified in the Probe-CD. Data reporting queue 712 can be a linkage to a reporting queue that is specific to an LI-operation. The reporting queue can store LI information that has been processed by the processing units referenced by data processor instances 710 and waiting for to be transmitted to upstream probes.

Different parts of the PR-LIC can be accessed by different modules in the probe. For example, data collection and reporting scheme 704 and data collector instance 708 can be accessed by probe data collection (PRDC) module 604. Data processor instance 710 and data reporting queue 712 can be accessed by probe data processing (PRDP) module 606. Data reporting queue 712 can be accessed by probe communication (PRCOM) module 610, which can insert the information elements from the data reporting queues 712 of all active PR-LICs into a set of common queues, with each common queue corresponding to a communication interface to an upstream probe/IoTSP 110. The insertion of the information elements in the common queues can be based on, for example the priority and criticality of the information elements.

Probe Data Processing Module

In some embodiments, probe data processing (PRDP) module 606 can process the LI information collected from the host, and from other downstream probes, as specified by IoTSP 110 or by the upstream probe. PRDP module 606 can also process the collected information at an LI information processing frequency (PROBE_FOIP), which can be determined based on, for example, the FoR of LIIE(s) to be reported by the probe. This may also include preparation of LI information taking into consideration privacy aspects. In some embodiments, PRDP module 606 can prepare bulk LI data to comply with privacy requirements as specified by IoTSP 110 or the upstream probe. PRDP module 606 can also determine schedule of delivery of LIIEs based on prior-pending-queue and priority of the LIIE(s) to be reported by the probe. Further, PRDP module 606 can verify delivery of the LI information and report diagnostics including privacy exceptions to the upstream probe or IoTSP.

Probe Data Collection Module

In some embodiments, probe data collection (PRDC) module 604 can monitor fulfillment of LIAC and report the fulfillment to the next level upstream or to the IoTSP, to provide an indication that the condition(s) for starting collection of information for LI (for a specific LI operation corresponding to an LISP) and taking subsequent actions for LI (including processing of the collected data, transmission of the collected data to an upstream probe or IoTSP, etc.) has been met. While reporting LIAC fulfillment, PRDC module 604 can ensure that the privacy requirements (configured as part of Probe-CD) are complied with (for example, obfuscation of certain information). PRDC module 604 can also collect LI information as specified by the upstream probe or IoTSP 110 from the host to which the probe is connected and/or from other downstream probes. The collection of the LI information can be at the specified frequency and priority as indicated in the Probe-CD (derived from LISP). PRDC module 604 can also take predetermined actions for fault-tolerance particularly for LI information that is critical. For example, if an upstream probe determines that one of the downstream probes fails, it can switch to a back-up downstream probe. PRDC module 604 can collect different types of LI information, including bulk data (BU-DAT-PROBE), and can transmit the collected bulk data to the next level upstream probe and/or IoTSP 110.

Probe Communication Module

In some embodiments, probe communication (PRCOM) module 610 can provide communication with upstream probes/IoTSP as well as downstream probes, by establishing a virtual channel after the initial communication with each probe/IoTSP 110. PRCOM module 610 can ensure that the appropriate communication channel of the host (to which the probe is attached) is chosen and also ensures that the LI information is communicated in a secure manner by making necessary adaptations to the communication format (e.g., use of different encryption keys, use of appropriate protocols e.g., IPsec, etc.). PRCOM module 610 can provides the received information to various modules in the probe. For example, PRCOM module 610 may transmit LI information and diagnostics information to PRDC module 604. PRCOM module 610 may also transmit received Probe-CD and Probe-DI information to PRCFM 602.

Moreover, PRCOM 602 may also transmit LIIEs and bulk data (BU-DAT-PROBE) to the next-level upstream probe and/or IoTSP 110. PRCOM 602 may also schedule the transmission of BU-DAT-PROBE and LIIEs to ensure that the LIIEs can be sent in a timely manner fulfilling the priority, criticality and FoR requirements.

Host Plug-in Module

Host plug-in (HPIN) module 608 can provide a plug-in interface for the probe with the host to which the probe is attached. The plug-in could be in-memory mechanism such as API-call; an inter-process communication mechanism such as queues, sockets, etc. The probe can be co-located with the host or remotely connected via wired/wireless channel with the host.

IoT Central Database

In some embodiments, IoTCDB 108 can store details about the PAST-DP of IoT users based on inputs collected from different network elements (ICG 104, IoTSP 110, cellular network, etc.). PAST-DP, which is the device and network footprint of the LI target user from past LI sessions, can contain information such as details of the devices and IoTN owned by the IoT user (including aspects such as nature and type of the IoT devices and IoTN, etc.), to which networks the IoTN and associated devices of the IoT user had been connected to in the past, which places were visited by the IoT user etc. Upon receiving a request, IoTCDB 108 can provide all the relevant details of PAST-DP information about a specific IoT user.

Method of Performing Effective LI with Minimal Privacy Intrusion

Figure 8:
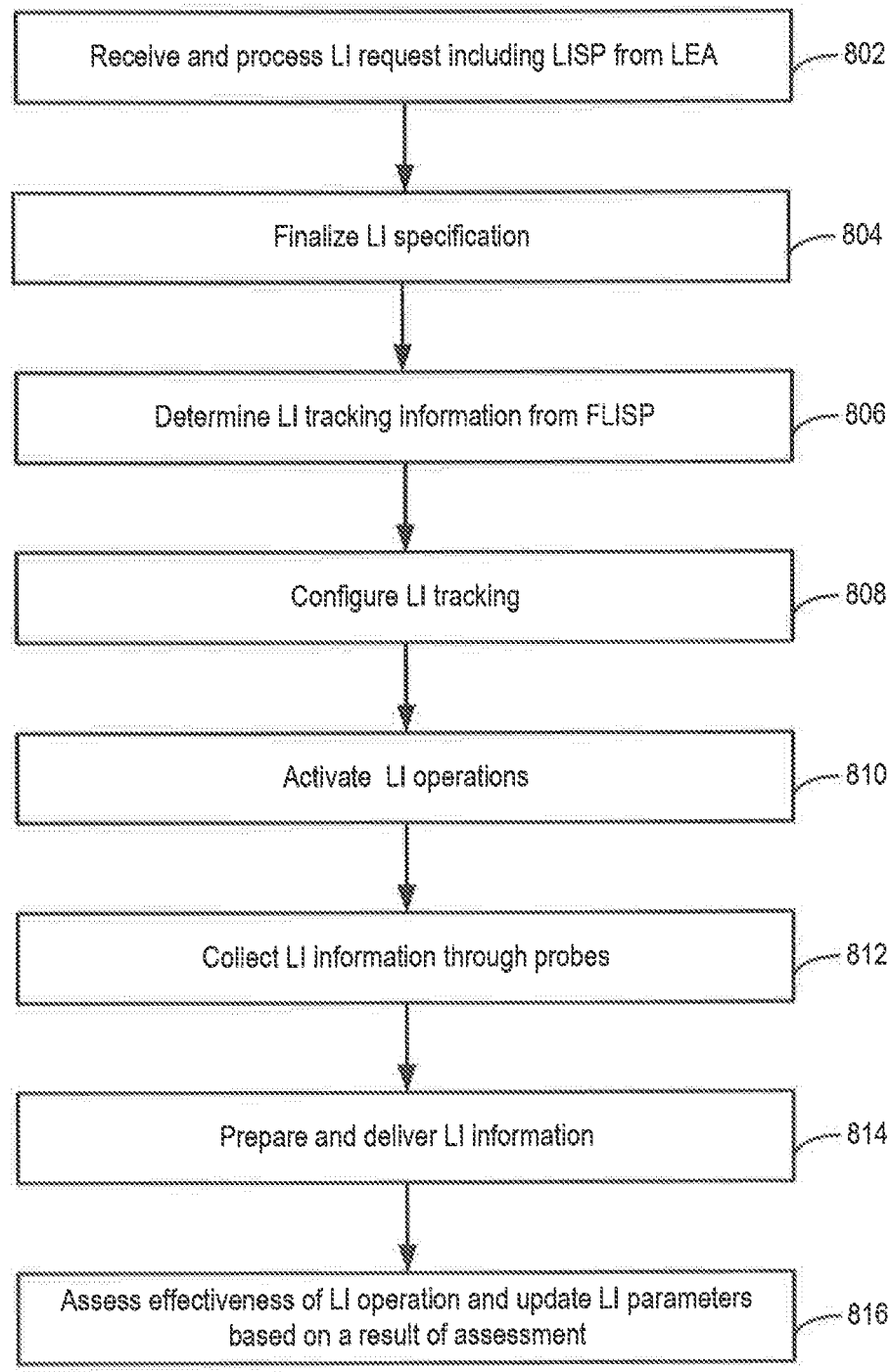
FIG. 8 is a flowchart illustrating an exemplary method for lawful interception according to some embodiments of the present disclosure.

Reference is now made to FIG. 8, which illustrates an exemplary method 800 for lawful interception (LI) at an IoT super-probe (IoTSP). Method 800 can be performed by a system including, for example, IoTSP 110 of FIG. 1.

After an initial start, the system receives and processes a LEA request including LI specification (LISP), in step 802. In some embodiments, IoTSP 110 may receive the LISP from LI gateway (LIG) 114, the LISP can be received by SPCOM module 212 in the IoTSP via the LIG. SPCOM 122 can then provide the LISP to LISH module 202 in the IoTSP.

In case the LISP contains a query from the LEA to know about available options for BU-DAT handling (BDH) as supported by the IoTSP, LISH module 202 can also obtain a list of available modes for bulk data handling (AMBDH) and the default mode of BDH (DMBDH) from LIPC module 208, which LIPC module 208 can fetch from IoTSPCS storage. LISH module 202 can then transmit the AMBDH information, via SPCOM module 212 of the IoTSP, to LIG 114 over the I1 interface. LIG 114, in turn, can transmit the received AMBDH information to the LEA. LEA may transmit its preferred bulk data handling option (LPBDH) to LIG 114, which can forward to LISH module 202 in the IoTSP via the SPCOM module 212 over the I1 interface. LISH module 202 may update the DMBDH for this LISP (DMBDH-LISP) as LPBDH for this LISP, and provides this update to LIPC module 208.

In step 804, LISH module 202 in IoTSP 110 can extract the LISP from the LEA request for LI and create BLIIEs from the LISP. LISH module 202 can then send the BLIIEs to LIPC module 204 of IoTSP 110. LIPC module 204 can check for the usability of the PAST-DP data of the IoT user in the IoTSPCS. In case the PAST-DP of the IoT user in the IoTSPCS is stale, LIPC module 204 can obtain the PAST-DP from IoTCDB via SPCOM module 212, and if required can prepare the PAST-DP data with contents as described in IoTSP 110 system description. LIPC module 204 can obtain relevant privacy requirement settings through the steps described in detail below.

Method of Obtaining Relevant Privacy Requirement Settings

The system (e.g. LIPC module 204) can obtain information from IoTCDB 108 on the relevant ICGs corresponding to the network(s) the IoT user and/or devices and IoTN were previously connected to or are currently connected to. LIPC module 204 can then request the ICG(s) for the relevant privacy requirement settings which may include privacy settings of the specific network in which the ICG is connected to, privacy settings of the specific IoTN and/or IoT devices (available with ICG or in a central database such as IoTCDB 108), and privacy settings of the IoT user, in case LIPC module 204 is not able to obtain this information directly from the operator network. Next, LIPC module 204 can obtain the relevant privacy settings about the specific network requested above from identified ICG. In some embodiments, LIPC module 204 can also fetch regulatory as well as operator/overall network level privacy policy information, if locally available and usable (i.e., not stale), or else from a central database such as IoTCDB 108.

Referring back to FIG. 8 and step 804, the system (e.g. LIPC module 204) can check feasibility of tracking using the steps described in detail below.

Method of Determining Feasibility of Tracking

The system (e.g. LIPC module 204) can compare the reporting need of BLIIE against the obtained privacy settings to determine which BLIIEs may be reported fully, which BLIIEs may be reported partially (in this case, also determine which part(s) can be reported), and which BLIIEs cannot be reported at all. The comparison can be a simple comparison of the BLIIEs against relevant privacy setting values, or it can involve determination of the relevant privacy settings for each BLIIE and then comparing them with pre-configured thresholds to determine the possibility of reporting fully or partially, etc. Based on the results of the comparison, LIPC module 204 can determine the feasibility of reporting of each BLIIE, construct the BLIIE-STRUCT, and update FE_STAT for each BLIIE.

Referring back to FIG. 8 and step 804, the system (e.g. LIPC module 204), after determining the feasibility of tracking, can recommend ASI/alternate information. For each BLIIE in the BLIIE-STRUCT with FE_STAT value of PART_FEAS (1) or INFEAS(0), LIPC module 204 can determine ASI/alternate information (ASI) that can be provided to LEA without intruding into the privacy as described in detail below.

Method of Determining Alternate Sources of Information

In the absence of historical data about ASI, LIPC module 204 can use pre-configured information to determine the ASI. In case the historical data about ASI is available, LIPC module 204 can use the historical ASI information and match it with the nature of investigation to arrive at appropriate ASI. LIPC module 204 can then ensure compliance to latest privacy settings of the involved network(s) by comparing the ASI information against the privacy settings, and in case of any mismatch/violation, LIPC module 204 can remove that specific ASI. Next, LIPC module 204 can finalize the list of privacy-compliant ASI. In some embodiments, at the end of each LI session of a LI operation, LIPC module 204 can store the appropriate ASI information (along with the investigation type) based on the initial LISP and the FLISP arrived at after the negotiation of LISP between LIPC module 204 and the LEA via the LIG 114.

Referring back to FIG. 8 and step 804, in case of finding no ASI, LIPC module 204 can update the BLIIE with the indication that no ASI exists. LIPC module 204 can also increment the count of PART_FEAS/INFEAS BLIIEs with no ASI (COUNT_BLIIE_NO_ASI).

Further, LIPC module 204 can prepare and send response to the LEA. LIPC module 204 can determine whether there is an incomplete match between what was requested by the LEA in the LISP and what can be provided by IoTSP 110 by checking if the BLIIE-STRUCT comprises one or more BLIIEs with FE_STAT having the value PART_FEAS or INFEAS. LIPC module 204 can perform next action based on the results of this determination.

In the case of a complete match between what was requested by the LEA in the LISP and what can be provided by IoTSP 110, LIPC module 204 can prepare the LISPR which contains the feasibility status of all information requested by the LEA in the LISP as "feasible". LIPC module 204 can then send the LISPR to the LEA over X1 interface (via SPCOM module 212) along with the indication that it shall proceed further with LI as instructed by the LEA. The LISP can be considered as the FLISP and the method can proceed to step 806.

In the case of an incomplete match between what was requested by the LEA in the LISP and what can be provided by IoTSP 110, LIPC module 204 can check the COUNT_BLIIE_NO_ASI value to determine if there are some BLIIEs with no ASI. In the case where COUNT_BLIIE_NO_ASI is greater than zero (i.e. there is at least one BLIIE for which there is no ASI), LIPC module 204 can prepare the LISPR based on the BLIIE-STRUCT by including feasibility status as "feasible" for the information items which can be reported without any privacy constraints. For the information items in the LISP which can be reported partially or cannot be reported at all, LIPC module 204 can take action based on if ASI exist or do not exist. If ASI exist, then LIPC module 204 can include feasibility status as "partly feasible" and include details of what can be reported and ASI with details of what will be reported as an alternative. If ASI do not exist, then LIPC module 204 can include the feasibility status as "infeasible." The LIPC module 204 can then determine a feasibility value (LI_FEAS). In some embodiments, LI_FEAS may be a simply assigned the value of COUNT_BLIE_NO_ASI, or it may be determined as a composite value computed as a weighted sum of BLIIEs having no ASI and BLIIEs for which an ASI is available (with the weights determined based on whether ASI exists or not, and based on the priority and criticality of the BLIIE as obtained from the LISP). If the LI_FEAS is less than a pre-defined threshold, then LIPC module 204 can then send the LISPR to the LEA over X1 interface (via SPCOM module 212) along with the indication that it shall not proceed further with the LI session, and wait for further instructions from the LEA, and upon receiving an updated LISP the LIPC module 204 executes the actions starting from determining the feasibility of tracking in Step 804 as described above. If the LI_FEAS is greater than or equal to the pre-defined threshold, then the LISP can be considered as the FLISP and the method can proceed to step 806.

In the case of an incomplete match between what was requested by the LEA in the LISP and what can be provided by IoTSP 110 and the COUNT_BLIIE_NO_ASI is zero (i.e., ASI exists for all BLIIEs which are not fully feasible to be reported), LIPC module 204 can prepare the LISPR based on the BLIIE-STRUCT by including feasibility status as "feasible" for the information items which can be reported without any privacy constraints. For the information items in the LISP which can be reported partially or cannot be reported at all, LIPC module 204 can include feasibility status as "partly feasible" and can also include details of what can be reported, and ASI with details of what will be reported as an alternative. The LIPC module 204 can then determine a feasibility value (LI_FEAS). In some embodiments, LI_FEAS may be determined as a weighted sum of all BLIIEs whose feasibility status is 'partly feasible', with the weights determined based on the priority and criticality of the BLUE as obtained from the LISP. If the LI_FEAS is less than a pre-defined threshold, then LIPC module 204 can then send the LISPR to the LEA over X1 interface (via SPCOM module 212) along with the indication that it is waiting for an updated LISP from the LEA. LIPC module 204 can then wait for further instructions from the LEA, and upon receiving an updated LISP from the LEA, the LIPC module 204 executes the actions starting from determining the feasibility of tracking in Step 804 as described above. If the LI_FEAS is greater than or equal to the pre-defined threshold, then the LISP can be considered as the FLISP and the method can proceed to step 806.

In step 806, the system can determine LI tracking information from the finalized LISP (FLISP). In some embodiments, the system (e.g., LISH module 202 or LIPC module 204) determines what LI information elements (LIIEs) needs to be tracked along with criticality/importance, priority and frequency of reporting (FoR), etc. The determination of the LI information elements may include identifying primary LIIEs (PLIIE) based on information-type, criticality, priority and FoR. The system (e.g., LISP module 204) may also determine the frequency of LI information processing (FOIP) by the LIIPREP taking into consideration the FoR of all PLIIEs. For example, the FOIP can be the lowest common multiple (LCM) of FoRs of all PLIIEs. The FOIP can be stored in the IoTSP-LI-context (I-LIC).

The system (e.g., LIPC module 204) may also determine underlying LIIEs (ULIIEs) for each PLIIE based on information-type, criticality, priority and FoR, and form PLIIE and ULIIE hierarchy (similar to the one shown in FIG. 3) based on elementary-LIIE dependency relationships (ELIIEDR), taking into consideration factors like information-type, criticality, priority, FoR, processing-logic (PL).

The system (e.g., LIPC module 204) may also identify the possible sources of information and events for each information element (LIIE) based on, for example, FoS, FoR, and probe configuration details (PRODET). For each LIIE (PLIIE, ULIIE), the system may determine frequency of information sample (FoS) and processing logic (LIIE-PL) based on ELIIEDR, FoR and information-type. For example, if PLIIE information-type is time-average of underlying ULIIE, the PLIIE content may include aggregation of all values of ULIIE averaged over a time period associated with the FoS, with FoS determined based on the following exemplary expression:

$$FoS = FoR * \text{minimum number of samples needed} \quad \text{(Expression 1)}$$

The system (e.g., LIPC module 204) also updates the information source mapping table (ISMT) (e.g., Table 1 above) with the LIIE-PL and possible sources of information. The system also creates the appropriate ISMT (AISMT) by determining appropriate data sources (primary/fallback sources) based on ISMT and ELIIEDR (criticality, priority), mobility and security information of the probes. An exemplary set of strategies for appropriate information source determination is provided below:

TABLE 4

| Parameter | Value Range | Strategy for appropriate information source determination |
|---|---|---|
| FoR | High | Information source should be closer to the IoT network depending on other conditions |
| FoR | Low | Information source can be away from the IoT network depending on other conditions |
| FoS | High | Information source should be closer to the IoT network depending on other conditions |
| FoS | Low | Information source can be away from the IoT network depending on other conditions |
| Criticality | High | Need to have more than one information source for reliability/fault-tolerance depending on other conditions |
| Criticality | Low | One information source may be sufficient depending on other conditions |
| Priority | High | Higher preference for information delivery scheduling depending on other conditions |
| Priority | Low | Lower preference for information delivery scheduling depending on other conditions |
| Mobility | High | Information source should be closer to the IoT network depending on other conditions |
| Mobility | Low | Information source can be away from the IoT network depending on other conditions |
| . | | |
| . | | |
| . | | |

The system (e.g., LIPC module 204) can also determine suitability rank for the identified sources from ISMT based on the above strategy and the probe-details (PRODET) (past credentials/history, etc.).

In some embodiments, the system (e.g. LIPC module 204) can also determine privacy rank for the possible information sources in ISMT according to the historical data based on the number and type/severity level of the relevant privacy exceptions. If local data on relevant privacy exceptions does not exist, LIPC module 204 can take the privacy exceptions that are closely related to the specific LIIE in determining privacy rank, and may apply a lower weightage to the privacy rank in further steps.

Additionally, the system (e.g. LIPC module 204) can compute a weighted average of the suitability rank and the privacy rank to determine the appropriateness rank. LIPC module 204 can further choose the appropriate sources of information for each LIIE in the ISMT based on the appropriateness rank and the above strategy and construct the AISMT.

In some embodiments, the system (e.g. LIPC module 204) can adapt the LIIE-PL based on the chosen appropriate data sources taking into consideration the privacy settings of the probe and/or the (sub) network of which the probe is a part of, privacy settings of the LITG user, etc. For example, part of the identity information may have to be masked and only generic location information should be shared, etc.

The system (e.g., LIPC module 204) can also fill the adapted LIIE-PL (ALIIE-PL) in the AISMT. In some embodiments, the system (e.g., LIPC module 204) can also prepare LI-PROTOP based on the appropriate probe(s) selected in the previous step and the LIIE hierarchy. For each LIIE (PLIIE & ULIIE) in AISMT, the system may identify DLIIE (dependent LIIE) where the LIIE has one or more ULIIE. For each PLIIE and DLIIE, the system may also determine if it is raw data that requires preparation. The system may also determine an information preparation node (IPN) which aggregates the information for preparing the PLIIE/DLIIE and prepares and sends the PLIIE/DLIIE. The IPN can be determined based on the LIIE-PL and the LI-PROTOP (e.g., as shown in FIG. 4A).

In some embodiments, the system (e.g. LIPC module 204) can determine LI activation conditions after preparation of AISMT and LI-PROTOP. LIPC module 204 can fetch the high-level LI activation condition from the LISP. Based on the probes chosen for each PLIIE/ULIIE in the AISMT and the LI-PROTOP, LIPC module 204 can determine LI activation condition for each probe level taking into consideration the privacy settings for the particular probe. LIPC module 204 can also determine what information should be reported by each probe when LI activation conditions are met, taking into account the privacy restrictions. LIPC module 204 can then update the AISMT with the IPN and LI activation condition information, along with the information to be reported when LI activation conditions are met.

The system (e.g., LIPC module 204) can further proceed to configure LI tracking, in step 808. The system may perform configuration of IoTSP 110 and the probes. For example, LIPC module 204 may fetch LI activation condition for each probe present in the AISMT. Further, both IoTSP 110 and the probes are also configured for the LI operation. For IoTSP 110, LIPC module 204 can create an IoTSP context (I-LIC) that stores LIIE hierarchy and dependencies, ISMT, AISMT, probe topology, etc. LIPC module 204 can also configure the other modules in the IoTSP for LI data collection, preparation and transmission to LIG. For example, LIPC module 204 sets the LIAC conditions stored in LIACTRL module 206. LIPC module 204 also sets the information related to LI probe topology (LI-PROTOP), and for each PLIIE, the FoR, the priority, and criticality stored in LI data collection (LIDC) module 208 and LI information preparation (LIIP) module 210. LIPC module 204 also configures LIIP module 210 about the details of the information reporting structure and the FOIP. LIPC module 204 can also configure the LIIPREP with respect to the privacy requirements to be taken into consideration when preparing the data to be sent to LIG 114.

The system (e.g., LIPC module 204) can also configure LI-probes at the data sources. For example the system may determine probe configuration for determined appropriate data-sources. For each data-source or probe in AISMT, the LIPC can determine the configuration to be done for each probe based on the LISP, probe configuration details (PRODET), and the probe mapping for each LIIE (PLIIE and DLIIE). The system may also prepare complete configuration details for each probe (e.g., Probe-CD). For example, LIPC module 204 can prepare the complete Probe-CD for each probe based on the information present in AISMT, Probe past performance (PRODET-PASTPERF), LI-PROTOP and LISP. The bulk LI-information requirements from the probe (BU-DAT-PROBE) can also be included in the Probe-CD. The Probe-CD can also contain details of privacy requirements to enable the probe to report any privacy violations during LI operation. The system can also determine delegation information (Probe-DI) for each probe. For example, LIPC module 204 determines Probe-DI for each probe based on IPN details from AISMT and the probe-config-data (Probe-CD). It can also fetch and prepare the configuration-data associated with the Probe-DI. After determination of the Probe-CD and Probe-DI information, LIPC module 204 can transmit the configuration data (Probe-CD and Probe-DI) to the probe(s) via LIACTRL module 206 and the host to which the probe is plugged into. LIPC module 204 can also store the complete Probe-CD for all probes in the I-LIC.

The system (e.g., LIPC module 204) can also configure the I2 and I3 interfaces for transmission of LI information. For example, for each PLIIE, LIPC module 204 may determine which interface(s) (primary and secondary) to be I2 interface(s), and which protocols are to be used for sending the PLIIE to LIG 110, based on the priority, FoR, available resources on the interface, security requirements, criticality, IoTSP past performance of the interfaces according to IoTSP past performance (IoTSP-PAST-PERF) information, etc. LIPC module 204 can also determine which interface(s) (primary and secondary) to be I3 interface(s) based on the expected amount of BU-DAT to be transferred and the available communication resources. The expected amount of BU-DAT can be computed based on the data types of the information to be collected, FoS, etc. LIPC module 204 can also configure SPCOM module 212 with information about the I2 and I3 interfaces. SPCOM module 212 can then also establish the communication channels with the LIG 110 for the LI session.

Further, the system (e.g., LIPC module 204) can also update the set of connection handles stored in connection handles 506 of the I-LIC with the interfaces information. LIPC module 204 can also provide the default bulk data handling information (including any privacy consideration requirements) extracted from LISP (DMBDH-LISP) to LIDC module 208 for appropriate configuration of bulk-data handling (BDH).

Moreover, the system (e.g., LIDC module 208) may configure BDH, and update the I-LIC with DMBDH-LISP, based on the following exemplary algorithm:

```
if DMBDH-LISP = Time-stamp based overwriting
then{
    configure DMBDH-LISP method locally
}
else{
    compute space requirements for the LI session based on the data
    types
    in the LISP and pre-provisioned storage limits for those data types
    (e.g., for location data, minimum 10 kb of data, is required)
    if free space available > space required for the LI session (for all the
    data types in the LISP)
    then {
    allocate required space for DMBDH-LISP for the session;
    mark this allocated space as 'in use' to prevent overwriting when
    storage space runs out for Time-stamp based overwriting method.
    }
    else {
    obtain additional space from the space used for time-stamp based
    overwriting, for example, the space used by the oldest, records;
    if unable to obtain additional space,
    then {
    transmit a notification to LEA (via SPCOM module 212 and LIG
    114), and wait for further instructions;
    if LEA instructs to still use fixed space allocation,
    then{
    obtain additional space from the space used for time-stamp based
    overwriting considering space used by newer records;
    }
```

```
    else{
    employ DMBDH-LISP method as Time-stamp based overwriting
    for the present LI session; and
    inform LIPC module 204 and update DMBDH-LISP in I-LIC;
    }
    }
    mark this entire allocated space as 'in use' to prevent overwriting
    when storage space runs out for Time-stamp based overwriting
    method.
}
```

The system (e.g., LIACTRL 206) can then proceed to activate LI operations, in step 810. For activation of the LI operations, LIACTRL module 206 may receive notification from relevant probe(s) which detects fulfillment of LIAC. LIACTRL module 206 can then transmit LI activation signal to all the configured probes. Upon receipt of the LI activation signal, each probe may forwards necessary activation signals to the downstream probes in the probe-topology, and starts its own LI operation. The starting of the LI operation at the probe will be described in more detail below.

LIACTRL module 206 can also notify LIDC module 208 and LIIPREP module 210 that LI has been activated at the probes. Upon receipt of LI activation signal from LIACTRL module 206, LIDC module 208 can activate the data collector instance in the I-LIC for that LI operation. Moreover, LIIPREP module 210 can also start a periodically recurring timer of duration LIIP_TIMER for that specific I-LIC to enable LI information processing at the appropriate instants of time to meet the FOIP requirement. For example, if FOIP is 6 per minute (i.e., once every 10 seconds), the timer could fire at the 8th, 18th, 28th, 38th, 48th and 58th second of each minute, assuming a processing delay of 2 seconds, and LIIPREP module 210 can activate the data processor instance in the I-LIC (e.g., data processor instance 510) so the data processor instance can process the data based on the LIIP_TIMER.

Some of the information for the FOIP and the processing delays can be preconfigured, or received from LIPC module 204. LIIP_TIMER values can also be adapted based on IoTSP past performance (IoTSP-PAST-PERF) parameters. For example, the values stored in LIIP_TIMER can be decreased by a factor that is inversely proportional to the % of success in timely delivery to LIG 114.

In some embodiments, the system (e.g., LIACTRL module 206) can also pass LIAC fulfillment notification to LIPC module 204 in IoTSP 110 to determine if any privacy violation occurred during the reporting of LIAC fulfillment. LIPC module 204 can check if any privacy violation occurred by checking if any additional information was reported by the probe that sent the LIAC notification, and whether the contents violated any privacy settings. In case of a privacy setting violation, LIPC module 204 can update IoTSP-PR-DIAG-INFO of such violations after determining the type and severity of the violation. LIACTRL module 206 can also send LIAC notification to LIIPREP module 210 to ensure that privacy aspects are considered before sending any notification of LIAC fulfillment to LIG 114, for example, abstraction of activation time, exact trigger details, etc.

Further, the system (e.g., LIDC module 208 and SPCOM module 212) can proceed to collect LI information through the probes, in step 812. The collection of LI information may include, for example, SPCOM module 212 receiving LI information from host plug-in (HPIN) module 608 of the respective probe via the host to which the probe is attached to, and provide it to LIDC module 208. LIDC module 208 may receive the LI information from each probe at the specified FoR and in the order as defined by the priority. LIDC module 208 may provide the information collected for a specific I-LIC (which has a corresponding LISP) to the data collector instance 508 of the specific I-LIC, which can stores the information along with any notifications (e.g., missed delivery) received from the probes. LIDC module 208 may also receive the LI information pertaining to the same LIIE from multiple probes for LIIEs marked as critical.

In some embodiments, LIDC module 208 can also collect bulk data (BU-DAT) from different probes, and transmit the collected data to SPCOM module 212 if no preparation of BU-DAT is required to comply with privacy requirements. If BU-DAT requires preparation to comply with privacy requirements, then LIDC module 208 sends BU-DAT to LIIPREP module 210 which then sends the prepared (and privacy requirements compliant) BU-DAT to SPCOM module 212. The handling of bulk data can be based on DMBDH-LISP information stored in the I-LIC. If DMBDH-LISP indicates a time-stamp based overwriting, LIDC module 208 may overwrite oldest records upon running out of storage space. Otherwise, LIDC module 208 may determine whether the currently used storage for a particular LI operation exceeds a predetermined percentage (e.g., 80%) of allocated storage space for the LI operation. If the currently used storage exceeds the predetermined percentage, LIDC module 208 may transmit a notification to LIG 114 to ensure timely fetching of BU-DAT before it is overwritten.

LIDC module 208 may also collect local probe diagnostics information (IoTSP-PR-DIAG-INFO) for each probe based on inputs received from the data collector instances at IoTSP 110. The probe diagnostics information may also include any inputs that it receives from other components in the IoTSP (e.g., exception encountered notification from SPCOM module 212). When any component in the IoTSP (e.g., LIDC module 208) generates a probe diagnostics info specific to an LI operation (corresponding to LISP, and to a specific I-LIC), that component may also fetch I-LIC details (e.g., I-LIC id and LISP id), and include these details along with the specific diagnostic information (e.g., security exception for that particular LI operation alone) in the IoTSP-PR-DIAG-INFO.

In some embodiments, if any additional information regarding an intrusion into the privacy settings is reported from the probes during LI data collection, LIDC module 208 can consider it as a privacy exception. LIDC module 208 can update the count, type and severity of the exception as part of IoTSP-PR-DIAG-INFO. Further, if any additional information that is not regarding an intrusion into the privacy settings is reported from the probes during LI data collection, LIDC module 208 can configure the probe to report the additional information. The additional information details can be collected as part of IoTSP-PR-DIAG-INFO for later reference to be used for probe selection.

LIDC module 208 may also receive from each probe, the probe diagnostics information (PR-DIAG-INFO) that is composed of diagnostics information collected locally in the probe, as well as diagnostics information collected and aggregated from one or more downstream probes. LIDC module 208 can then provide the IoTSP-PR-DIAG-INFO (collected at IoTSP) and PR-DIAG-INFO (collected at each probes) to LIPC module 204.

The system (e.g., LIIPREP module 210) can proceed to prepare and deliver collected LI information, in step 814. The preparation and delivery of LI information can occur when the LIIP_TIMER expires for a specific I-LIC, which would cause LIIPREP module 210 to trigger the data processor instance of that I-LIC to perform the LI information preparation.

As a part of the LI information preparation, LIIPREP module 210 can determine, based on the FoR for each PLIIE, the PLIIEs to be prepared at that particular instant of time for transmission to LIG 114. For those PLIIEs to be prepared for transmission, LIIPREP module 210 may assess availability of adequate information for preparing the PLIIE content. The assessment may include, for example, checking adequacy of information transmitted by LIDC module 208. If the information is deficient, the system may perform a set of re-configuration actions (Probe-topology, ISMT, AISMT), the details of which are to be described below in method of re-configuration of probe topology and probes.

On the other hand, if the information is adequate, LIIPREP module 210 may prepare the PLIIE based on the processing logic (PL) using the information that is available to create an output in the format/structure as specified in the LISP. For PLIIEs associated with high or medium criticality, LIIPREP module 210 may fetch the information received from the primary probe for all those information sub-elements which were received successfully and in a timely manner. For information sub-elements that were not received successfully (and/or in a timely manner) from the primary probe, LIIPREP module 210 may also fetch the information received from the fallback probe. LIIPREP module 210 can then prepare the PLIIE contents based on the fetched information.

The PL can also contain relevant instructions for compliance to privacy requirements, for example, obfuscation/masking of certain information or parts of certain information (e.g. with default or no value), with-holding or removing certain information or parts of certain information (e.g. device identity), replacing certain information or parts of certain information with generic/less private information, either pre-configured or obtained during operation. Example of pre-configuration could be to replace the individual device name with a generic name such as "Alice" or "Bob", and example of information obtained during operation could be to replace the specific location (e.g., supermarket) to the generic location obtained from the network (e.g., area xyz).

If there is adequate information for a PLIIE to be delivered, LIIPREP module 210 may determine schedule of delivery of LI information. For example, LIIPREP module 210 may schedule to deliver what LI information can be delivered (e.g., based on the PLIIE preparation done in the previous step), taking into consideration the prior-pending queue (PPQ), and the priority of the PLIIE. For example, if the PPQ contains pending information for that PLIIE, and has to be delivered before the currently prepared information, LIIPREP module 210 may schedule the delivery of the newly prepared PLIIE after the delivery of the PLIIE information in the PPQ.

On the other hand, if there is insufficient information for a PLIIE to be delivered, LIIPREP module 210 may prepare a deficiency notification, and schedule it to be sent at the same priority as that of the PLIIE. The deficiency notification can also be in the form of PLIIE filled in with some reserved values, to notify LEA about the deficiency. Moreover, for highly critical PLIIEs, LIIPREP module 210 may create a place-holder for backup delivery schedule, and update the PPQ accordingly. For other PLIIEs, LIIPREP module 210 may determine to skip delivery, or to schedule the delivery at a later time when, for example, the missing information arrives.

After generating the PLIIEs, LIIPREP module 210 may transmit the PLIIEs to LIG 114 via SPCOM module 212 using the interface and protocols as determined and configured earlier. To prepare for the transmission, the data processor instance 510 of the specific I-LIC may insert the data to be reported into the data reporting queue 512 in that I-LIC. SPCOM module 212 can then fetch the LI information from the data reporting queue 512 and insert them into a common queue for the interface via which the LI information is to be reported to LIG 114. The insertion of the data into the common queue can be based on the priority and criticality of the information to be reported.

SPCOM module 212 can also transmit the BU-DAT (received from LIDC module 208) to LIG 114 over the I3 interface using the communication channel and protocols configured by LIPC module 204. SPCOM module 212 may also schedule BU-DAT transmission in such a way so as to ensure that the PLIIEs are sent in a timely manner adhering to the priority, criticality and FoR requirements as specified by the LEA in the LISP.

In some embodiments, SPCOM module 212 can also verify if the transmitted PLIIE was delivered successfully to the LIG. For an unsuccessful (and/or untimely) delivery, SPCOM module 212 may handle differently depending on the PLIIE priority and then criticality. For example, for non-critical PLIIE, SPCOM module 212 may skip the delivery. For PLIIE with high priority, SPCOM module 212 may trigger a re-transmission using backup channel. If the re-transmission also fails, SPCOM module 212 can then take action based on the criticality. In case of repeated issues with delivery of a PLIIE with high priority, the system may also execute re-configuration actions, as discussed below. For PLIIE with high criticality, SPCOM module 212 may put the transmission task back in pending queue for re-transmission.

Further, the data processor instance 510 in the I-LIC and SPCOM module 212 can also provide relevant diagnostic information about the IoTSP performance, e.g., rate of successful delivery, rate of successful timely delivery, etc. for that specific LI operation, to LIPC module 204.

Further, in addition to verifying delivery of the transmitted PLIIE, the system (e.g., LIACTRL module 206) can check for privacy compliance. LIACTRL module 206 can determine a privacy-compliance-factor (PCF) for each probe by initially computing the weighted product of each exception type (WPET) as the weighted product of number of exceptions and severity. LIACTRL module 206 can further compute the PCF as the sum of all WPETs. LIACTRL module 206 can further compare the WPETs and the PCF against pre-configured thresholds and take appropriate action(s) which may include triggering re-configuration of probe-topology (the details of which are to be described below in method of re-configuration of probe topology due to privacy considerations) or updating historical data of the probe in the IoTSPCS.

Referring back to FIG. 8, steps 812 and 814 are executed until the end of the LI session. At the end of the LI session, the system may update learnings about the LI operation to determine the effectiveness of the LI operation, and to identify LI configuration and operational parameters for adjustments, in step 814. LIPC module 204 may determine the effectiveness of each probe, as well as IoTSP 110, for a particular LI operation based on various parameters.

For probe effectiveness determination, LIPC module 204 may compute the adjusted values of the probe performance parameters for each probe employed for the LI session starting from the probe that is farthest downstream. These probe performance parameters may include adjusted probe aggregate success rate (ADJ-PR-SUCC-AGGREG), adjusted probe information delivery success rate (ADJ-PR-SUCC-INFO-DELIV), adjusted probe information timely delivery success rate (ADJ-PR-SUCC-TIMELY-DELIV), etc. These parameters can be determined based on the following exemplary expressions:

$$\text{ADJ-PR-SUCC-AGGREG} = \text{PR-SUCC-AGGREG} + \text{alpha} * m \quad \text{(Expression 2)}$$

Here, alpha can be a pre-provisioned value (e.g., 5%), and m can be a number of downstream probes of which the corresponding probe parameter (PR-SUCC-INFO-DELIV) is below a threshold value PR-SUCC-INFO-DELIV-THRESHOLD.

$$\text{ADJ-PR-SUCC-INFO-DELIV} = \text{PR-SUCC-INFO-DELIV} + \text{beta} * r \quad \text{(Expression 3)}$$

Here, beta can be a pre-provisioned value (e.g., 15%), and r can be a number of downstream probes of which the corresponding probe parameter (PR-SUCC-INFO-DELIV) is below a threshold value PR-SUCC-INFO-DELIV-THRESHOLD.

$$\text{ADJ-PR-SUCC-TIMELY-DELIV} = \text{PR-SUCC-TIMELY-DELIV} + \text{gamma} * k \quad \text{(Expression 4)}$$

Here, gamma can be a pre-provisioned value (e.g., 10%), and k can be a number of downstream probes whose the corresponding probe parameter (PR-SUCC-TIMELY-DELIV) is below a threshold value PR-SUCC-INFO-TIMELY-DELIV-THRESHOLD.

The system (e.g., system 100) can determine the effectiveness of the probe for an LI operation based on the aforementioned adjusted values, as well as a number indicating a number of exceptions handled by the probes (PR-EXCEP-HANDLED). As an illustrative example, the system can compute an initial effectiveness parameter (I_EFF) based on the following exemplary expression:

$$\text{Initial effectiveness \% (I\_EFF)} = \text{Average of(PR-SUCC-EVT-PROC, PR-SUCC-CONT-PROC,} \\ \text{ADJ-PR-SUCC-AGGREG, ADJ-PR-SUCC-INFO-DELIV, ADJ-PR-SUCC-TIMELY-DELIV,} \\ \text{PR-EXCEP-HANDLED)} \quad \text{(Expression 5)}$$

As another illustrative example, the system can also compute I_EFF parameter based on a composite weighted average of the above-listed factors and a moving window (of fixed number of samples) of the corresponding factors in probe past performance (PR-PAST-PERF) data, which can include H-PR-SUCC-EVT-PROC, H-PR-SUCC-CONT-PROC, H-PR-SUCC-AGGREG, H-PR-SUCC-INFO-DELIV, H-PR-SUCC-TIMELY-DELIV, H-PR-EXCEP-HANDLED.

The system can also assign a scaling factor to the computed I_EFF parameter if the PR-EXCEP-COUNT exceeds a threshold PR-EXCEP-COUNT-THRESHOLD, according to the following exemplary expression:

$$\text{Effectiveness \%} = \text{I\_EFF} * (\text{PR-EXCEP-COUNT-THRESHOLD} / \text{PR-EXCEP-COUNT}) \quad \text{(Expression 6)}$$

For IoTSP effectiveness determination, LIPC module 204 can compute the adjusted values of a set of IoTSP performance parameters. These probe performance parameters may include adjusted probe information delivery success rate (ADJ-IoTSP-SUCC-INFO-DELIV), adjusted probe information timely delivery success rate (ADJ-IoTSP-SUCC-TIMELY-DELIV), etc. These parameters can be determined based on the following exemplary expression:

$$\text{ADJ-IoTSP-SUCC-INFO-DELIV} = \text{IoTSP-SUCC-INFO-DELIV} + \text{omega} * p \quad \text{(Expression 7)}$$

Here, omega can be pre-provisioned value (e.g., 15%), p can be a number of downstream probes of which PR-SUCC-INFO-DELIV is below the PR-SUCC-INFO-DELIV-THRESHOLD.

$$\text{ADJ-IoTSP-SUCC-TIMELY-DELIV} = \text{IoTSP-SUCC-TIMELY-DELIV} + theta*w \quad \text{(Expression 8)}$$

Here, theta can be a pre-provisioned value (e.g., 10%), and w can be a number of downstream probes of which PR-SUCC-TIMELY-DELIV is below the PR-SUCC-INFO-TIMELY-DELIV-THRESHOLD.

In one example, the system can determine the effectiveness of IoTSP 110 for a LI operation based on the aforementioned parameters, as well as a number of exceptions handled by IoTSP, following exemplary expression:

$$\text{Rate of effectiveness} = \text{Average of (ADJ-IoTSP-SUCC-INFO-DELIV, ADJ-IoTSP-SUCC-TIMELY-DELIV, IoTSP-EXCEP-HANDLED)} \quad \text{(Expression 9)}$$

In another example, the rate of effectiveness can be determined as a composite weighted average of the above factors and a moving window of the corresponding factors in past performance of IoTSP (IoTSP-PAST-PERF) including, for example, IoTSP-SUCC-INFO-DELIV, IoTSP-SUCC-TIMELY-DELIV, and IoTSP-EXCEP-HANDLED.

For the probes and IoTSP 110, if LIPC module 204 determines that the effectiveness is below a predetermined threshold, LIPC module 204 may identify LI configuration and operation parameters requiring adjustments, and perform the adjustments. For example, if PR-SUCC-EVT-PROC (success rate of event processing), PR-SUCC-CONT-PROC (success rate of content processing), or ADJ-PR-SUCC-AGGREG values are below their respective thresholds, LIPC module 204 may determine that there are some issues with the probe operation. Moreover, if ADJ-PR-SUCC-INFO-DELIV and/or ADJ-PR-SUCC-TIMELY-DELIV values are below their respective thresholds, LIPC module 204 may determine that there are some issues with the communication interface used for the LI session, and hence effectiveness of the interface may require an update.

LIPC module 204 may also determine which IoTSP parameters may require modification. For example, if IoTSP-EXCEP-HANDLED (a number of exceptions handled by IoTSP) is less than the corresponding threshold, LIPC module 204 may determine to modify parameters such as security settings, interfaces used by the IoTSP towards the LIG that can be used, resource allocations, etc. If ADJ-IoTSP-SUCC-INFO-DELIV and/or ADJ-IoTSP-SUCC-TIMELY-DELIV values are below their respective thresholds, LIPC module 204 may determine that there is an issue with the communication interface used for the LI session, and may update the interface related parameters such as, for example, interface effectiveness, resources to be allocated for the interface(s), etc.

LIPC module 204 may consolidate the list of potential LI configuration parameters that may require an update. LIPC module 204 may also update the relevant parameters in PRODET-PASTPERF and IoTSP-PAST-PERF based on the values of the corresponding parameters during the current LI operation (as stored in PR-DIAG-INFO and IoTSP-PR-DIAG-INFO respectively), to update the history data of performance to include the latest data. Such an update may include, including the current value in a trend of values, removing the oldest entry (in case of using a fixed size observation window), storing additional indications such as the average of the priority and criticality of all the LIIEs delivered, etc.

After assembling a list of parameters to be updated, LIPC module 204 may adjust some or all of the parameters. In some embodiments, LIPC module 204 may check a history trend of some of those parameters, and determine the adjustment accordingly. For example, LIPC module 204 may determine whether the trends of H-PR-SUCC-TIMELY-DELIV, H-PR-SUCC-INFO-DELIV, H-PR-SUCC-EVT-PROC, H-PR-SUCC-EVT-PROC and H-PR-SUCC-AGGREG indicate that these parameters had fallen below their respective thresholds for, say, 'n' instances out of the last 'm' LI operations, or have fallen below threshold for 'k' consecutive instances. If there is no significant correlation/overlap of the instances (e.g., number of common instances being less than a predetermined threshold 'r') when H-PR-SUCC-TIMELY-DELIV/H-PR-SUCC-INFO-DELIV had been below the threshold, LIPC module 204 may determine there is likely to be an issue with the interface(s) used, and that the configurations for the interface are to be updated.

On the other hand, if no historical trend data is available (e.g., when IoTSP 110 powers up), LIPC module 204 may perform primary cause analysis and correlation, to determine which of these parameters have contributed the most in the performance. For example, if interface(s) parameters were identified as possibly requiring an update, LIPC module 204 may determine whether PR-SUCC-EVT-PROC (event processing success rate at the probe), PR-SUCC-CONT-PROC (content processing success rate at the probe) and ADJ-PR-SUCC-AGGREG are below their corresponding thresholds, which can indicate whether the processing components at the probes are operating properly. If none of these parameters is below their threshold, LIPC module 204 may determine there is likely to be an issue with the interface(s) used, and determine to update the configuration of the interface(s).

On the other hand, LIPC module 204 may determine the impact of those parameters on lowering the values of ADJ-PR-SUCC-TIMELY-DELIV, ADJ-PR-SUCC-INFO-DELIV, etc. For example, if PR-SUCC-EVT-PROC and ADJ-PR-SUCC-AGGREG are below their respective thresholds (while PR-SUCC-CONT-PROC is above its threshold), the system may determine a new ADJ-PR-SUCC-TIMELY-DELIV parameter, and a new ADJ-PR-SUCC-INFO-DELIV parameter, according to the following exemplary expression:

$$\text{NEW-ADJ-PR-SUCC-TIMELY-DELIV} = \text{ADJ-PR-SUCC-TIMELY-DELIV}/[\text{Average}\{(\text{PR-SUCC-EVT-PROC-THRESHOLD} - \text{PR-SUCC-EVT-PROC}), (\text{PR-SUCC-AGGREG-THRESHOLD} - \text{ADJ-PR-SUCC-AGGREG})\}] \quad \text{(Expression 10)}$$

$$\text{NEW-ADJ-PR-SUCC-INFO-DELIV} = \text{ADJ-PR-SUCC-INFO-DELIV}/[\text{Average}\{(\text{PR-SUCC-EVT-PROC-THRESHOLD} - \text{PR-SUCC-EVT-PROC}), (\text{PR-SUCC-AGGREG-THRESHOLD} - \text{ADJ-PR-SUCC-AGGREG})\}] \quad \text{(Expression 11)}$$

If LIPC module 204 determines that the values of NEW-ADJ-PR-SUCC-TIMELY-DELIV or NEW-ADJ-PR-SUCC-INFO-DELIV are still below their respective thresholds, LIPC module 204 may determine that there is likely to be an issue with the interface(s) used, and determine to update the interface configurations.

After determining the configurations to be updated, LIPC module 204 can determine the adjustments to be done, and perform the adjustment. The determination of the adjustments can be based on past corrective actions. For example, for the H-PR-SUCC-TIMELY-DELIV trend, if increasing the resources allocated for that interface(s) for an LI operation was a prior remedial action, the system may update the configuration in IoTSPCS to allocate more resources for that interface(s) for future LI operations.

On the other hand, if the past corrective actions information are not available, the system may also determine a new set of adjustments. For example, if LIPC module 204 determines that interface related parameters are to be updated, LIPC module 204 may examine the trend of exceptions related to stability of the particular interface(s) and/or congestion. The examination may be based on historical trend (if available), or based on the number of exceptions reported during the current LI operation. If LIPC module 204 determines that there is a steady occurrence of such exceptions (e.g., interface stability/congestion occurred for more than 'p' times), the system may determine to adapt the effectiveness of the interface accordingly by, for example, decreasing by a value that is proportionate to (e.g., being a weighted average of) the H-PR-SUCC-TIMELY-DELIV trend. If H-PR-SUCC-TIMELY-DELIV trend does not contain any values, the system may also decrease effectiveness by a factor proportionate to NEW-ADJ-PR-SUCC-TIMELY-DELIV or ADJ-PR-SUCC-TIMELY-DELIV, if any of these parameters are available.

If there is no steady occurrence of such exceptions related to stability of the interface(s), the system may examine the resource allocation trend for those interface(s), if available. If there is no significant difference in resource allocation trend or if no trend is available, the system may update the amount of resources to be allocated for those interface(s) per LIIE in the IoTSPCS for future LI operations. For example, the system may update allocation of bandwidth per LIIE.

The system (e.g., LIPC module 204) can also ascertain, based on PR-DIAG-INFO and IoTSP-DIAG-INFO, the number of instances when insufficient/incomplete information was provided by a probe for the LIIEs for which ASI was provided. LIPC module 204 can further compare the values against pre-configured thresholds and adapt the probe effectiveness appropriately, e.g., using pre-configured factors. Based on the negotiation between LIPC module 204 and the LEA/LIG 114, LIPC module 204 can update the ASI information in the IoTSPCS along with the investigation type for use in future LI sessions.

Further, the system (e.g., LIPC module 204) can determine the effectiveness of privacy compliance. LIPC module 204 can analyze the privacy exceptions reported by the probe(s) as well as by LIIPREP module 210 in IoTSP 110. LIPC module 204 can determine for each probe the WPET for each exception type and the PCF as described in step 814 of method 800 for the entire LI session. LIPC module 204 can then update PRODET-PARTPERF with relevant information. LIPC module 204 can compare the WPETs and the PCF against pre-configured thresholds and decide to take appropriate actions which may include adapting the probe effectiveness, removing the probe as a possible source of information for the specific information type, etc.

Method of Performing LI Operation at LI Probe

Figure 9:
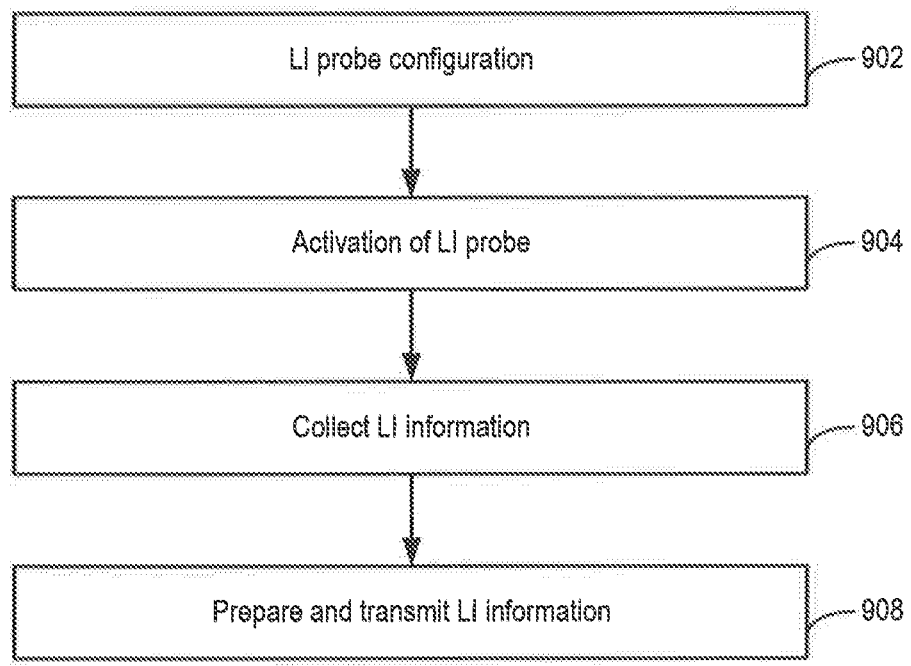
FIG. 9 is a flowchart illustrating an exemplary method for lawful interception according to some embodiments of the present disclosure.

Reference is now made to FIG. 9, which illustrates an exemplary method 900 for lawful interception (LI) at an LI probe.

After an initial start, the probe can perform configuration for an LI operation, in step 902. The configuration can be performed after the probe receives, via probe communication (PRCOM) module 610, Probe-CD and Probe-DI from upstream probes and/or IoTSP 110. PR configuration module (PRCFM) 602 in the probe can then identify the relevant configuration details for each module in the probe and configures each module of the probe as per the identified configuration. A listing of configuration parameters for each module is shown in the table below:

TABLE 5

| Module | Configuration parameters |
|---|---|
| PRDC | LIAC, FoS, priority, criticality, privacy violations |
| PRDP | LI-PROTOP and for each LIIE, the FoS, FoR, priority, criticality, information reporting structure, compliance with privacy requirements, reporting privacy exceptions |
| PRCOM | LI-PROBE-ITF-PROTOS |

PRCFM module 602 can store the Probe-CD and Probe-DI, create a probe-LI-context (PR-LIC) for the specific LI operation, and update the PR-LIC instance with available/determined information Probe-CD, Data collection scheme, etc. The PRCFM module 602 also configures each module in the probe. This includes configuration of the PRDC module 604 to report privacy violations and PRDP module 606 to take appropriate (preventive/corrective) actions with respect to complying with privacy requirements, including preparation of the LI content to comply with privacy requirements and raising privacy exceptions. PRCFM module 602 can also identify and push relevant configuration data further to downstream probes based on Probe-CD and Probe-DI.

PRCFM module 602 can also determine LI interface configurations. For example, for each LIIE, PRCFM module 602 may determine which interface and which protocols (LI-PROBE-ITF-PROTOS) are to be used for sending the LIIE to the upstream probes and/or to the IoTSP as appropriate, based on the priority, FoR, available resources on the interface, security requirements, criticality, recommendation on the interface to be used as received in the Probe-CD, etc. As an illustrative example, a medium-secured and low latency interface can be used for a LIIE with high priority to be sent from a probe which is in a medium-secure environment (which can be determined based on location, etc.). PRCFM module 602 can also determine the interface to be used for sending bulk data based on available interfaces, expected volume of bulk data to be sent, etc. PRCFM module 602 can then configure PRCOM module 610 with the interface and protocol information. After PRCOM module 610 establishes communication channels via the host with the upstream probes and/or IoTSP 110 for the LI operation, PRCFM module 602 can updates connection handles 706 in the PR-LIC with the interface(s) and protocol(s) to be used for that LI operation.

After the configuration, the LI probe can then be activated, in step 904. Probe data collection (PRDC) module 604 may determine the fulfillment of LI activation condition. The determination can be based on, for example, detection of the fulfillment of one or more LIAC (LI activation conditions) at the probe by the PRDC module 604 in the probe. In this case, the PRDC module 604 in the probe informs the PRDC module 604 of the next level upstream probe in the probe topology if present, or the LIACTRL module 206 in the IoTSP 110 otherwise. The determination can also be based on receiving information about LIAC fulfillment from one or more next-level downstream probes in the probe topology. In this case also, the PRDC module 604 in the probe informs the PRDC module 604 of the next level upstream probe in the probe topology if present, or the LIACTRL module 206 in the IoTSP 110 otherwise. Further, the determination can also be based on receiving an LI activation signal from an upstream probe, or from LIACTRL module 206 in IoTSP 110, which PRDC module 604 can forward to the downstream probes based on the Probe-DI information. While reporting the fulfillment of LI activation condition, PRDC module 404 can ensure compliance with privacy requirements as provided in the Probe-CD.

Upon receiving an LI activation signal from an upstream probe, or from LIACTRL module 206 in IoTSP 110, PRDC module 604 can initiate LI information collection in the probe, and notify that PRDP module 606 in the probe that LI has been activated. PRDP module 606 may also determine the frequency of LI information processing frequency (PROBE_FOIP) based on, for example, the FoR of all LIIEs to be reported by the probe. For example, the PROBE_FOIP can be the lowest common multiple (LCM) of FoRs of all LIIEs to be prepared and sent by the probe. Based on PROBE_FOIP, PRDP module 606 can compute the duration of the LI information processing timer in the probe (LI-PROBE-IP-TIMER-VAL). PRDP module 606 can then adapt the LI-PROBE-IP-TIMER using the SCF_FOIP_TIMER received earlier in the Probe-CD to obtain the ADAPT-LI-PROBE-IP-TIMER-VAL, according to the following exemplary expression:

$$\text{ADAPT-LI-PROBE-IP-TIMER-VAL} = \text{LI-PROBE-IP-TIMER} * \text{SCF\_FOIP\_TIMER} \quad \text{(Expression 12)}$$

PRDP module 606 can further start a periodically recurring timer LI-PROBE-IP-TIMER of duration ADAPT-LI-PROBE-IP-TIMER-VAL to enable LI information processing at the appropriate instants of time to meet the PROBE_FOIP requirement. PRDP module 606 can also store the LI-PROBE-IP-TIMER timer details in the PR-LIC.

After the LI probe has been activated, the LI probe can proceed to collect LI information, in step 906. PRDC module 604 may sample or collect LI information for the concerned LIIE at the corresponding FoS from the host to which the probe is plugged into via host plug-in (HPIN) module 608. The collected LI information can include communication content as well as events. PRDC module 604 may also receive LI information from a downstream probe in the probe topology. In the event that the LIIE is marked as critical, PRDC module 604 may also receive LI information pertaining to the same LIIE from multiple probes. PRDC module 604 may provide the information collected for a specific PR-LIC to the data collector instance 708 of the specific PR-LIC, which can also store the collected information along with any notifications (e.g., missed delivery) received from any downstream probe(s). PRDC module 604 can also transmit the bulk data (BU-DAT-PROBE) information to PRCOM module 610.

In some embodiments, PRDC module 604 may also collect probe diagnostics information (PR-DIAG-INFO) locally for each probe based on the observations made during the data collection (e.g., inputs received from data collector instance 708 of a specific PR-LIC), and any inputs that it receives from other components in the probe (e.g., exception encountered notifications from PRCOM module 610), and provides the probe diagnostics information to PRDP module 606. The PR-DIAG-INFO may contain generic probe-level diagnostic info as well as PR-LIC specific diagnostic info (e.g., security exception for that particular LI operation alone). In the latter case, relevant Probe-CD details (e.g., LI operation identifier) can be fetched from the PR-LIC and included in the PR-DIAG-INFO contents together with the diagnostic info.

After the LI information has been collected, the probe can then proceed to process the LI information for transmission to LIG 114, in step 908, when LI-PROBE-IP-TIMER fires. The processing of LI information in the probe may be performed by the Data processor instance 710 in the PR-LIC when triggered by the PRDP module 606. As part of the processing, the Data processor instance 710 may determine which LIIEs have to be (prepared and) transmitted, based on FoR. For the determined LIIEs, the Data processor instance 710 may determine whether PRDC module 604 may have provided adequate LI information for reporting. If the data is deficient, Data processor instance 710 may prepare a deficiency report to be sent to the next-level upstream probe, or to IoTSP 110. If the data is sufficient, Data processor instance 710 may prepare the LIIE based on the PL using the information that is available to create an output in the format/structure as specified in the Probe-CD.

Further, the data processor instance 310 can check the collected data against the privacy settings as configured in the Probe-CD to determine any privacy violations. In case of violations, the data processor instance 310 can determine the appropriate corrective action. The corrective action may include removing the information content that caused the privacy violation entirely or in part from the LIIE information to be reported (and also remove it from local storage), anonymizing/obfuscating/masking the content appropriately, or replacing the content with generic or default values (based on pre-configuration, or based on information received in Probe-CD). The data processor instance 310 can also update the PR-DIAG-INFO with the details of the privacy violation/exception.

In the case of critical LIIEs (e.g., LIIE having high or medium criticality), and that some information sub-elements of the LIIE are not received successfully (and/or in a timely manner, depending on priority) from a primary probe, the Data processor instance 710 may determine whether there is a fallback probe for the LIIE. The fallback probe may be the probe itself (i.e., the probe that hosts Data Processor instance 710), or a downstream probe. In both cases, the Data processor instance 710 may fetch the LIIE information received from the fallback probe, and prepare the LIIE contents based on the fetched information.

The Data processor instance 710 in the probe may also determine schedule of delivery of the LIIE(s), based on the prior-pending queue (PPQ) and the priority of the LIIE. For example, if the PPQ contains pending information for that LIIE, and has to be delivered before the currently prepared information, then schedule the delivery of the newly prepared LIIE after the delivery of the LIIE information in the PPQ. If there is insufficient information for an LIIE to be delivered, Data processor instance 710 may prepare a deficiency notification. The deficiency notification can also be scheduled to be transmitted at the same priority as that of the LIIE by, for example, filling in the LIIE with some reserved values specifying the deficiency. For highly critical LIIEs, the probe may also create a place-holder for backup delivery schedule, and update the PPQ accordingly. For other LIIEs, the delivery may be skipped or delivery scheduled later if information arrives later.

For each LIIE, the probe may transmit the LIIE report to the next-level upstream probe or IoTSP 110 via PRCOM module 610 using the interface and protocols as determined and configured (LI-PROBE-ITF-PROTOS). To perform the transmission, data processor instance 710 of the specific PR-LIC may insert the data to be reported into the data reporting queue 712 in that PR-LIC. PRCOM module 610 also fetches the information in this queue and then inserts them into a common queue for the interface using which the LI information is to be reported to the upstream probe.

PRCOM module 610 may also insert the LI information fetched from the data reporting queue 712 of the PR-LIC into the common queue based on the priority and criticality of the information to be reported.

PRCOM module 610 can also transmit bulk data (BU-DAT-PROBE) received from PRDC module 604 to the next-level upstream probe (or IoTSP 110) using the interface and protocols as determined and configured earlier. In case the same interface is used for sending the LIIEs as well as BU-DAT-PROBE, PRCOM module 610 can schedule BU-DAT-PROBE with a lower priority or may defer sending BU-DAT-PROBE to ensure that the LIIEs are sent in a timely manner fulfilling the priority, criticality and FoR requirements.

After transmission of the prepared LI information, PRCOM module 610 determines whether the transmission is successful and timely. If the transmission is not successful, PRCOM module 610 may trigger a re-transmission using backup channel if the LI information is high priority. If the re-transmission also fails, PRCOM module 610 may take action based on the criticality, such as putting it in pending queue. If the LI-information is not critical, PRCOM module 610 may skip delivery of the information.

Method of Re-Configuration of Probe Topology (LI-PROTOP) and Probes

The system can execute this method for re-configuration of probe topology and probes. In some embodiments, Data processor instance 710 in the PR-LIC and SPCOM module 212 can provide relevant diagnostic info about the probe performance, e.g., % of successful delivery, % of successful timely delivery, etc. for that specific LI operation to PRDP module 606 in the probe. Further, PRDP module 606 can obtain diagnostic info provided by PRDC module 604 as explained in description of Step 906—based on PRDC module 604's observations, as well as diagnostic info collected from other components in the probe and next-level downstream probes. PRDP module 606 can consolidate the diagnostic info reported by the Data processor instance 710 of that specific PR-LIC, PRCOM module 610 and PRDC module 604. PRDP module 606 can further send this consolidated diagnostic info (PR-DIAG-INFO) to the next-level upstream probe or IoTSP 110 as appropriate.

Figure 10:
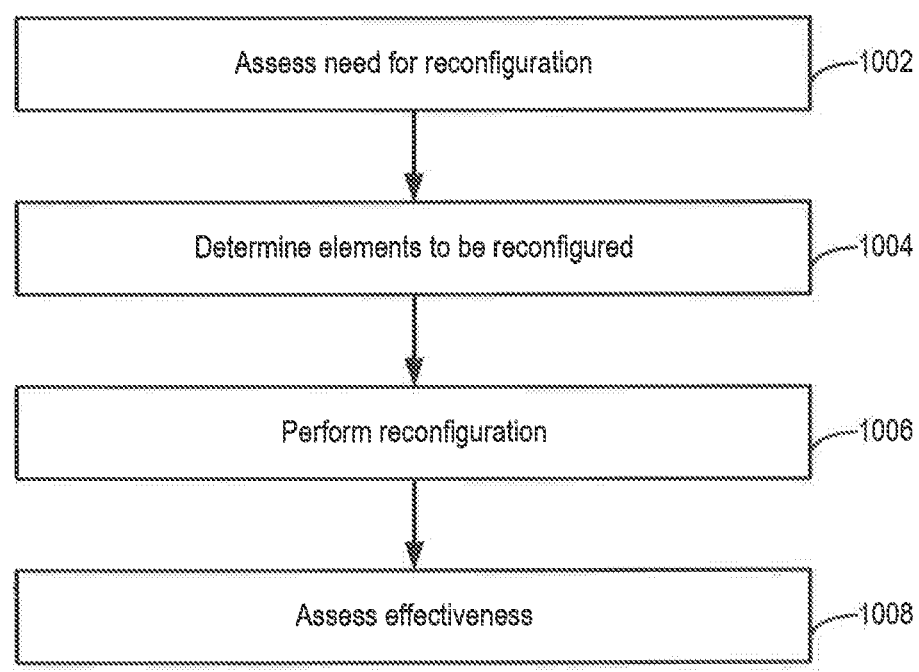
FIG. 10 is a flowchart illustrating an exemplary method for configuring a system for lawful interception according to some embodiments of the present disclosure.

Reference is now made to FIG. 10, which illustrates an exemplary method 1000 for reconfiguration of probe-topology (LI-PROTOP) and probes. In some embodiments, method 1000 can be performed by LIPC module 204 of IoSTP 110.

After an initial start, LIPC module 206 can determine whether there is need for reconfiguration, in step 1002. The determination can be based on the priority and criticality of the impacted LIIE(s). For example, if the priority or criticality is high, and the consecutive instances of failure of timely delivery exceeds a predetermined threshold, LIPC module 206 can determine there is need for reconfiguration.

In some embodiments, after determining that there is a need for reconfiguration, LIPC module 206 may determine the elements to be re-configured, in step 1004. The elements for reconfiguration may include, for example, LI-PROTOP (changing the topology of probes), the communication channel, etc. The determination can be based on the priority, criticality, etc., according to the follow exemplary algorithm:

If the LIIE is high priority and is successfully delivered but with a delay then{ if one or more probes responsible for that LIIE has toggled exceeds a pre-provisioned threshold
then{
reconfiguration element = LI-PROTOP;
}
else{
reconfiguration element = communication channel;
}
else{
if the LIIE is highly critical and was not delivered properly
then{
if one or more probes responsible for that LIIE had become unavailable
then{
reconfiguration element = LI-PROTOP;
}
else {
if alternate communication channels exist.
then {
reconfiguration element = communication channel;
}
else {
reconfiguration element = LI-PROTOP
}
}
else{
no reconfiguration is required
}
}

After determining the elements to be reconfigured, LIPC module 206 may perform the reconfiguration, in step 1006. In a case where the reconfiguration element is a communication channel (e.g., interface), LIPC module 206 may deselect the current communication channel, and choose an alternative communication channel based on, for example, the priority, FoR, available resources on the interface, security requirements, criticality, IoTSP past performance (IoTSP-PAST-PERF), etc.

In a case where the reconfiguration element is LI-PROTOP, LIPC module 206 may remove the currently used probes which have issues with info collection/preparation for the LIIE from the possible probes list in ISMT for that LIIE. LIPC module 206 can also determine new data sources (primary/fallback sources) based on ISMT and elementary-LIIE dependency relationship (ELIIEDR), which may include, for example, criticality, priority, FoR, FoS, etc. The determination can also be based on mobility and security information of the associated probes based on the strategy for example as shown in Table 4. LIPC module 206 may also determine suitability rank for the identified sources from ISMT based on the above strategy and the probe-details (PRODET) (past credentials/history, etc.). Based on the suitability rank, LIPC module 206 may select new sources for the LIIEs, and update both LI-PROTOP and AISMT.

To update AISMT, LIPC module 206 may identify DLIIE (dependent LIIE) where the LIIE has one or more ULIIE. For each DLIIE, LIPC module 206 may determine information preparing node (IPN) which aggregates the information for preparing the DLIIE, then prepares and sends the PLIIE/DLIIE. The IPN can be determined based on the LIIE-PL and the updated LI-PROTOP. Based on the probe(s) chosen, LIPC module 206 can also determine the LIAC for each probe level, update AISMT with the new IPN and LIAC for the LIIE (and dependent LIIEs), and update Probe-CD and Probe-DI for the newly selected probe(s) for the LIIE, and for the probes that have been de-selected, due to the change in LI-PROTOP and consequently the AISMT. LIPC module 206 can also update the I-LIC, and transmit the updated Probe-CD and Probe-DI information to all the impacted probes.

After performing the reconfiguration, LIPC module 206 can proceed to assess the effectiveness of the reconfiguration, in step 1008. The determination of whether the reconfiguration is effective can be based on evaluating the change in diagnostic parameters such as rate of successful delivery, rate of successful timely delivery, etc., over a time window (ADAPT-T-WIND). If the reconfiguration did not result in an improvement in the observed diagnostic parameters over the time window ADAPT-T-WIND, then LIPC module 206 can proceed to perform another reconfiguration by starting again from step 1002 after updating the ADAPT-T-WIND value as detailed below. If the reconfiguration resulted in an improvement in the observed diagnostic parameters over the time window ADAPT-T-WIND, LIPC module 206 can stop assessing the effectiveness of the reconfiguration and update the ADAPT-T-WIND value as explained below. The time window ADAPT-T-WIND can be of a pre-configured length, and can double every successive time when the improvement assessment results in a re-configuration action. Such an arrangement can result in more stability in the assessment. The ADAPT-T-WIND value can be restored to the pre-configured value if no re-configuration was triggered during the adapted time window.

Method of Re-Configuration of Probe Topology due to Privacy Considerations

The system (e.g., LIPC module 204 of IoTSP 110) can execute this method, for the specific LI operation whose identity was received in the trigger for reconfiguration, by assessing need for re-configuration and further performing the re-configuration. LIPC module 204 can adapt the pre-configured thresholds for the privacy exceptions based on the LEA investigation type. The adaptation may be based on pre-configured factors and/or may be based on correlation of the exception type with the investigation type. LIPC module 204 can compare the WPET of specific probes against pre-configured thresholds. Based on the comparison, LIPC module 204 can determine which probes may need to be re-configured for which LIIEs. LIPC module 204 can also examine the ISMT to determine alternative probes for the LIIEs identified in the previous step. Further, for the determined alternative probes which are part of the current LI session, LIPC module 204 can compare their PCF against pre-configured thresholds. In case their PCF is less than pre-configured thresholds, or if the alternative probes are not part of the current LI session, LIPC module 204 can proceed to performing re-configuration.

For each impacted LIIE, LIPC module 204 can remove the currently used probes which have issues with information collection/preparation for the LIIE from the possible probes list in ISMT for that LIIE. LIPC module 204 can then determine appropriate data sources (primary/fallback sources) using suitability rank and privacy rank as described in step 806 of method 800. The privacy rank computation can also take into account the number and type/severity level of the relevant privacy exceptions in the current LI session (e.g., a higher weightage is given to the privacy exceptions in current LI session). LIPC module 204 can determine the LIIE-PL based on the selected probes, taking privacy requirements also into consideration. Further, LIPC module 204 can determine LI activation conditions for the newly selected probe(s) and update the LI-PROTOP and AISMT with details such as LIIE-PL, IPN, LI activation conditions, etc. LIPC module 204 can also adapt Probe-CD and Probe-DI for the newly selected probe(s) for the LIIE, and for the probes that have been de-selected, due to the change in LI-PROTOP and consequently the AISMT. After completing the reconfiguration for all the impacted LIIEs, LIPC module 204 can update the I-LIC, and send the updated PROBE-CD and PROBE-DI information to all the impacted probes.

Computer System

Figure 11:
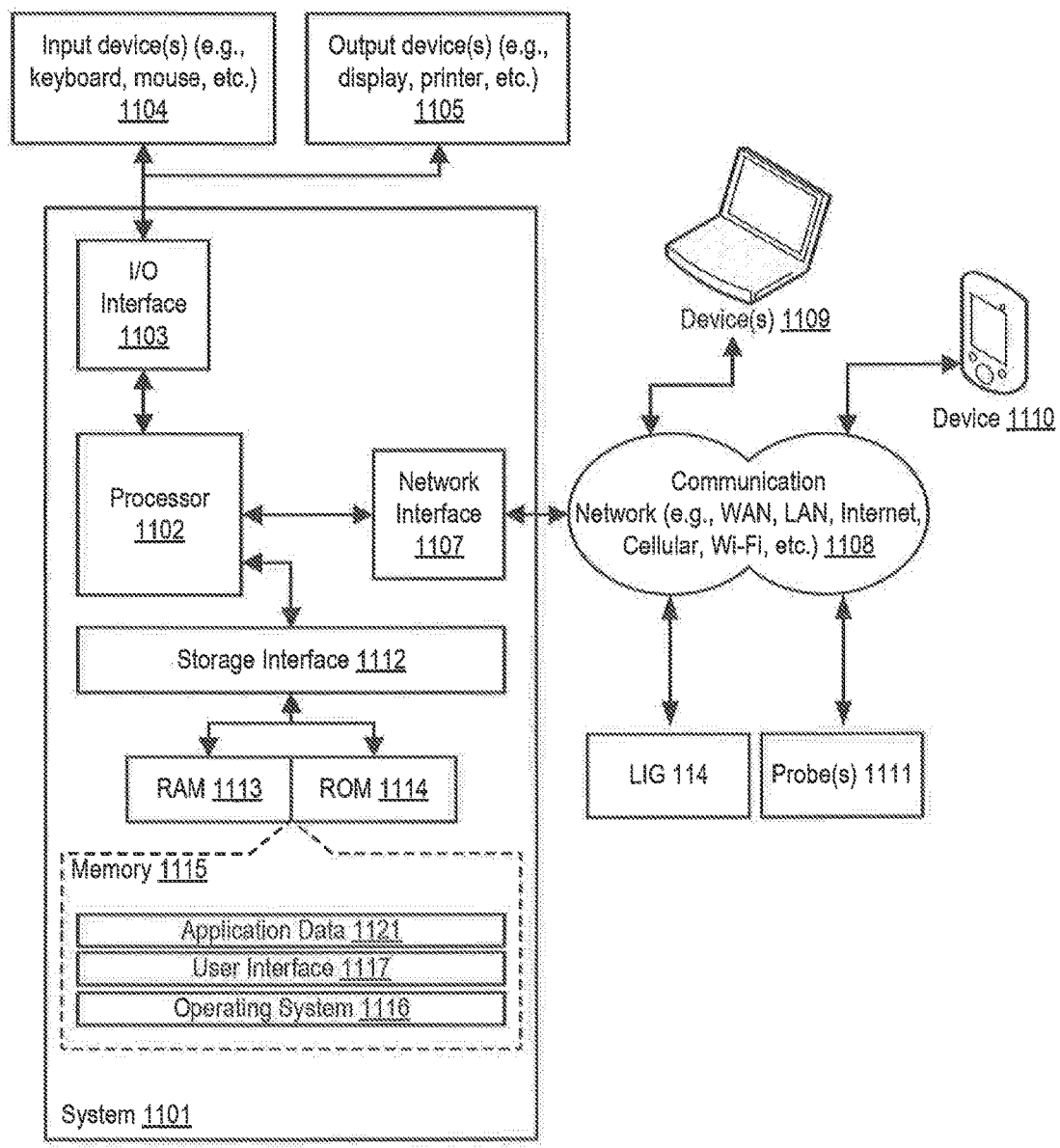
FIGS. 11 and 12 are block diagrams of exemplary systems for implementing embodiments consistent with the present disclosure.

FIG. 11 includes block diagrams of an exemplary system 1100 for implementing embodiments consistent with the present disclosure. Variations of system 1101 may be used for implementing, for example, IoTSP 110 of FIG. 1. System 1101 may comprise a central processing unit ("CPU" or "processor") 1102. Processor 1102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc Processor 1102 may be disposed in communication with one or more input/output (I/O) devices via I/O interface 1103. The I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), cellular network, Wi-Fi, the Internet, etc. Using the network interface 1107 and the communication network 1108, the system 1101 may communicate with devices 1109, 1110, as well as LIG 114 of FIG. 1 and probes 1111. Devices 1109 and 1110 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the system 1101 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 1116, user interface application 1117, application data 1121 (e.g., any data variables or data records discussed in this disclosure), etc. The operating system 1116 may facilitate resource management and operation of the system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1117 may facilitate display, execution, interaction, manipulation, or operation of program components through textual or graphical facilities. For example, user interfaces may provide computer interaction interface elements on a display system operatively connected to the system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

Figure 12:
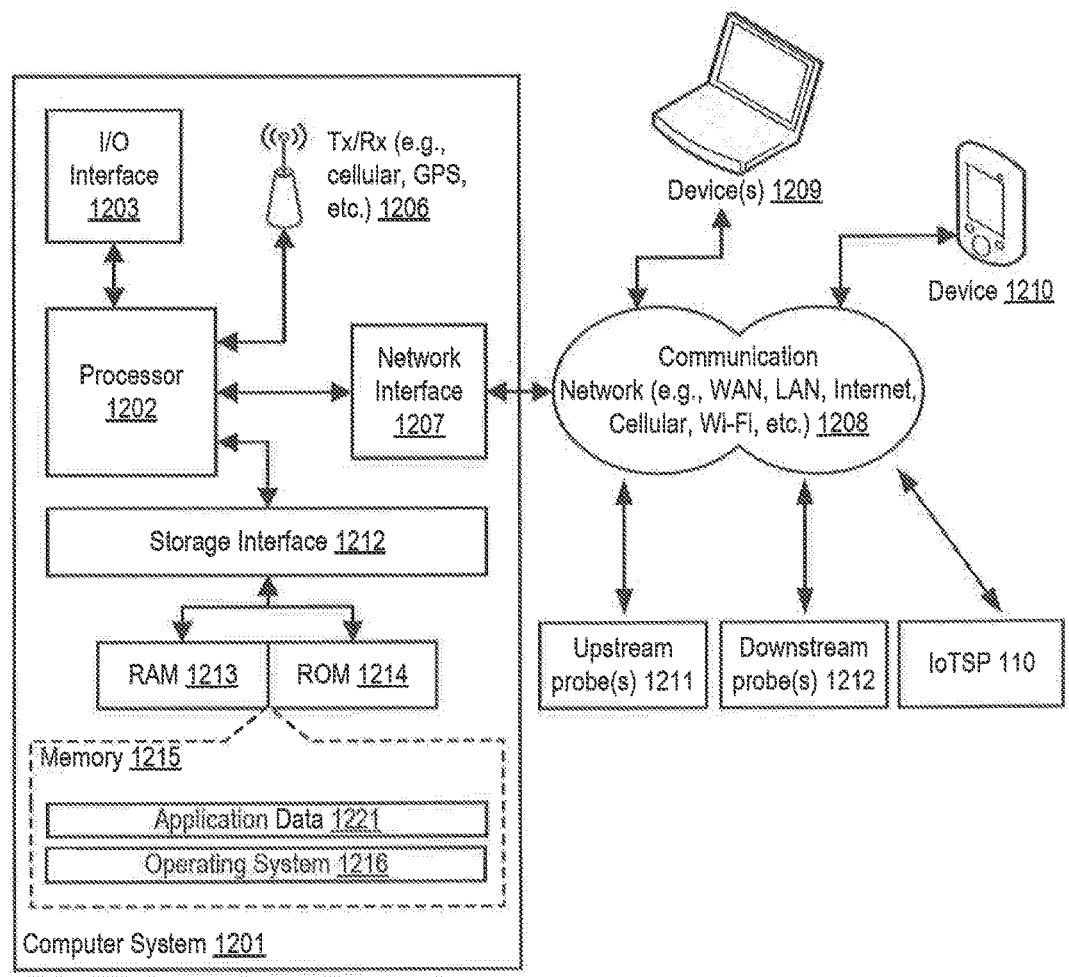

FIG. 12 includes block diagrams of an exemplary system 1200 for implementing embodiments consistent with the present disclosure. Variations of system 1201 may be used for implementing, for example, probe(s) 1111 of FIG. 11. System 1201 may comprise a central processing unit ("CPU" or "processor") 1202. Processor 1202 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1202 may be disposed in communication with one or more input/output (I/O) devices via I/O interface 1203. The I/O interface 1203 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

In some embodiments, the processor 1202 may be disposed in communication with a communication network 1208 via a network interface 1207. The network interface 1207 may communicate with the communication network 1208. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1208 may include, without limitation, a direct interconnection, local area network (LAN), wide area network (WAN), wireless network (e.g., using Wireless Application Protocol), cellular network, Wi-Fi, the Internet, etc. Using the network interface 1207 and the communication network 1208, the system 1201 may communicate with devices 1209, 1210, one or more upstream probes 1211, one or more downstream probes 1212, as well as IoTSP 110 of FIG. 1. Devices 1209 and 1210 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the system 1201 may itself embody one or more of these devices.

In some embodiments, the processor 1202 may be disposed in communication with one or more memory devices (e.g., RAM 1213, ROM 1214, etc.) via a storage interface 1212. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 1216, user interface application 1217, application data 1221 (e.g., any data variables or data records discussed in this disclosure), etc. The operating system 1216 may facilitate resource management and operation of the system 1201. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, system 1201 may store application data 1221, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for minimizing privacy intrusion during internet of things lawful interception of electronic information. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing a lawful interception (LI) information for an Internet of Things network (IoT Network), the method being performed by a topology of probes and comprising:
   finalizing a specification based on privacy requirement settings, wherein finalizing the specification comprises:
      determining a first value representing a feasibility of obtaining information to be reported and satisfying the privacy requirement settings; and
      preparing the specification based on a comparison of the first value with a predefined threshold value;
   generating a hierarchy of information elements based on the finalized specification, each of the information elements including information related to at least one of dependency and reporting requirement;
   determining, based on the privacy requirement settings, a set of data sources for providing the reporting information according to the hierarchy of information elements,
      wherein the privacy requirement settings comprise rules that govern at least one of: content-based data exposure, prevention of access of information by predetermined users, and obfuscation of predetermined information;
   determining a hierarchy of probes based on the set of the data sources, and associated privacy compliance level;
   configuring the topology of probes based on a set of configurations including privacy;
   activating the LI operation in the topology of probes;
   performing the LI operation by the topology of probes based on the set of configurations including privacy;
   verifying effectiveness of reporting conforming to reporting requirements and privacy compliance, and taking corrective action; and
   updating learning data in a historical database at the end of LI operation.

2. The method of claim 1, wherein finalizing the specification based on the privacy requirement settings further comprises:
   receiving, iteratively from a law enforcement agent (LEA) through an interface, a request for information about a lawful-interception-target, the request including the specification for the information to be tracked and reported;
   responsive to determining that the first value is below the predefined threshold value:
   determining a set of alternative information to be reported and a set of alternative information sources based on the reporting requirement and the privacy requirement settings,
   preparing a specification response containing information on the feasibility of information to be reported and the set of one or more alternative information to be reported, and
   transmitting, to the LEA via the interface, the prepared specification response; and
   responsive to determining that the first value is above or equal to the predefined threshold value, setting the specification as the finalized specification.

3. The method of claim 1, wherein determining a set of data sources for providing the hierarchy of information elements comprises:
   determining a set of candidate data sources based on the determined feasibility, and at least one of: frequency of reporting, frequency of sampling, nature and type of available probes, capability and past performance of the available probes;

determining a set of suitability ranks for the set of candidate data sources, the set of suitability ranks being determined based on at least one of: a frequency of reporting, a frequency of collecting data, a criticality of the data collection, a priority of the data collection, and the mobility of the set of candidate data sources;

determining a set of privacy ranks based on a history of exceptions for violation of the privacy requirement settings; and determining, from the set of candidate data sources, the set of data sources for providing the requested information based on a combination of the set of suitability ranks and the set of privacy ranks.

4. The method of claim 1, wherein configuring the topology of probes comprises:

determining the set of configurations including probe configurations at a super-probe within the topology of probes;

determining conditions for activating LI operation at the super-probe;

selectively cascading the set of configurations including the probe configurations and conditions for activating LI operation through the topology of probes, wherein the set of configurations include the privacy requirement settings to enable reporting, by the topology of probes, of privacy violations;

receiving set of configurations by a probe from an associated upstream probe in the topology of probes; and performing probe configuration comprising determination of probe level LI activation condition based on the received set of configurations, and configuration of each probe of the topology of probes based on the received set of configurations to perform probe operation.

5. The method of claim 4, wherein selectively cascading the set of configuration comprises:

extracting a portion of the received set of configurations, wherein the extracted portion is related to one or more LI operations at the downstream probes; and cascading the extracted configurations to downstream probes.

6. The method of claim 5, wherein the set of configurations further comprises at least one of: data to collect, frequency of data sampling, LI activation condition, frequency of transmission, processing logic and the privacy requirement settings, criticality, priority and policy of storing and overwriting the collected data at a probe in the topology of probes.

7. The method of claim 1, wherein activating the LI operation comprises:

receiving, by the super-probe from one or more downstream probes of the super-probe in the topology of probes, a notification of fulfillment of the conditions for activating the LI operation in the topology of probes;

receiving, by the super-probe from one or more downstream probes of the super-probe in the topology of probes including the super-probe, an indication of whether there is a violation of the privacy requirement settings caused by notification of the fulfillment of the LI activation conditions;

transmitting, by the super-probe to the one or more downstream probes of the super-probe in the topology of probes, activation signals to activate the LI operation in the topology of probes, upon receiving the notification of fulfillment of the conditions for activating the LI operation;

responsive to receiving, at a first probe of the one or more downstream probes of the super-probe, the signal to activate the LI operation:

initiating the LI operation at the first probe, and cascading the activation signals to a second probe that is a downstream probe of the first probe in the topology of probes to initiate the LI operation at the second probe; and responsive to receiving the indication that there is a violation of the privacy requirement settings caused by the fulfillment of the conditions, performing at least one of: updating diagnostics data that includes a type and a severity of the privacy violation, and updating the information to be reported based on the privacy requirement settings;

wherein the diagnostics data are used for verification of effectiveness and for updating the learning data.

8. The method of claim 1, wherein performing LI operation comprises:

performing probe operations by at least one probe in the topology of probes;

collecting data at the super-probe from the topology of probes as per set of configurations;

responsive to determining that the collection of the data violates the privacy requirement settings, updating diagnostic data to reflect the violation, wherein the diagnostics data are used for verification of effectiveness and for updating the learning data;

preparing data to be reported at the super-probe as per rules of reporting and privacy requirement settings;

transporting through at least one interface selectively, at least a part of the prepared data by the super-probe to a lawful interception gateway according to the reporting requirements; and receiving reporting status confirmation of transported data from the law enforcement agency (LEA) at the super-probe.

9. The method of claim 8, wherein performing the probe operations comprises:

collecting data at one or more probes in the topology of probes based on the set of configurations;

preparing data at one or more probes in the topology of probes based on the set of configurations in compliance with the privacy requirement settings;

controlling a transmission of at least a part of the prepared data within the topology of probes according to a hierarchy of the probes within the topology based on the set of configurations.

10. The method of claim 8, wherein the preparation of data at the super-probe comprises:

determining inadequacy of available data by analyzing the prepared data at the super-probe as per rules of reporting;

compensating for data inadequacy by adding at least one marker to influence the transporting through an interface, at least a part of the prepared data to a law enforcement agency via a lawful interception gateway according to the reporting requirements; and updating data to be reported based on a status of compliance with the privacy requirement settings wherein the updating includes at least one of obfuscating predetermined portion of collected information, and replacing the predetermined portion of collected information with generic information.

11. The method of claim 8, wherein the collected data comprises lawful interception data, supporting lawful interception data and diagnostics data, wherein the diagnostics data comprises one or more exceptions caused by privacy violations.

12. The method of claim 8, wherein the prepared data comprises lawful interception data, probe operation diagnostics data and probe-performance data.

13. The method of claim 8, wherein transporting through the at least one interface comprises:
    determining at least one of a schedule, a primary channel, and a secondary channel for transmission of the prepared data to be reported;
    transmitting at least part of prepared data to be reported through the determined primary channel as per the determined schedule;
    determining a status of the transmission of a report through a hardware interface using the primary channel, the status being determined based on at least one of a priority and a criticality associated with the transmission of the collected data; and
    responsive to determining that the status indicates that the transmission is not successful, performing at least one of triggering a transmission of the report using the secondary channel, updating the schedule for transmission of the report in the second set of configurations, and skipping transmission of the report.

14. The method of claim 1, wherein the verification of reporting conforming to reporting requirements and privacy compliance and taking corrective action comprises:
    verifying data collection effectiveness by analyzing the cumulative inadequacy of available data and cumulative reporting status confirmation from the law enforcement agency at the super-probe;
    verifying privacy compliance effectiveness by analyzing privacy exceptions reported by the topology of probes;
    determining need for configuring the topology of probes based on cumulative inadequacy of available data and cumulative reporting status confirmation from the law enforcement agency via the lawful interception gateway, and based on the privacy compliance effectiveness; and
    altering the topology of probes and configuring the altered topology of probes based on the determined need for configuring the topology of probes as corrective action.

15. The method of claim 1, wherein updating the learning data comprises:
    determining LI performance parameters and LI effectiveness parameters from the cumulative verified effectiveness, cumulative probe operation diagnostics data and cumulative probe-performance data and historical data;
    determining privacy compliance effectiveness parameters based on one or more privacy exceptions reported from the topology of probes;
    determining a historical trend of the probe performance parameters and the probe effectiveness parameters;
    identifying a portion of a set of configurations requiring alteration based on LI performance parameters, LI effectiveness parameters, and the privacy compliance effectiveness parameters; and
    altering the identified portion of the set of configurations requiring adjustments, and updating learning in the historical data, based on LI performance parameters, LI effectiveness parameters, the privacy compliance effectiveness parameters, the determined historical trend of the probe performance parameters, the probe effectiveness parameters, and the historical data.

16. The method of claim 14, wherein reporting the requirements comprises a frequency of reporting, a priority of reporting, and criticality of reporting of each information to be reported to the law enforcement agency via the lawful interception gateway.

17. The method of claim 14, wherein determining need for configuring the topology of probes based on the privacy compliance effectiveness comprises:
    determining, for each probe of the topology of probes, a first value representing a number of exceptions due to non-compliance with the privacy requirement settings and a second value representing a severity level for each of the number of exceptions; and
    determining that one or more probes of the topology of probes are to be reconfigured based on a weighted product of the first value and the second value of the one or more probes exceeding a pre-configured threshold.

18. The method of claim 7, wherein the privacy requirement settings are received from an interconnect gateway (ICG) and comprises at least one of one or more privacy settings of a network coupled with the ICG, one or more privacy settings of an Internet-of-Things (IoT) network, one or more privacy settings of an IoT device, and one or more privacy settings of an IoT user.

19. The method of claim 2, further comprising:
    determining at least one of alternative information or alternate data sources;
    determining whether the alternative information comply with the privacy requirement settings; and
    responsive to determining that at least a portion of the alternative information does not comply with the privacy requirement settings, removing the portion of the alternative information from the set of alternative information to be reported.

20. A topology of probes system for providing lawful interception (LI) information for an Internet of Things network (IoT Network), comprising:
    a memory storing a set of instructions;
    a super-probe connected to the lawful interception (LI) gateway by a set of LI-interfaces;
    a hierarchy of probes connected to the super-probe,
        wherein the hierarchy of probes comprises one or more probes connected to at least one upstream probe including the super-probe by one or more probe interfaces, and to one or more downstream probes by one or more probe interfaces,
        wherein the super-probe and the hierarchy-of-probes are configured to perform the LI operation according to one or more privacy requirement settings and to provide lawful interception (LI) information collected by the LI operation, and
        wherein the privacy requirement settings comprise rules that govern at least one of content-based data exposure, prevention of access of information by predetermined users, and obfuscation of predetermined information; and
    at least one hardware processor in a probe in the hierarchy of probes configured to execute the set of instructions to:
        acquire the lawful interception information from a host at a frequency and a priority specified in a configuration information;
        store reporting data in a data reporting queue based on the priority and criticality of information represented in the reporting data; and retrieve the reporting data from the data reporting queue for transmission to at least one of an upstream probe and the super-probe.

21. The topology of probes system of claim 20, wherein each probe in the hierarchy of probes comprises:
one or more hardware processors configured to execute a the set of instructions for providing:
a host plug-in module for collecting the LI data from a host;
a probe configuration module for performing probe configuration for LI operation including determination of a LI activation condition, wherein the probe configuration includes privacy requirement settings for privacy-related processing of the LI data;
a probe data collection module for collecting the LI data from the host including monitoring the LI activation condition fulfillment;
a probe data processing module for:
comparing the collected data against the privacy requirement settings for privacy-related processing;
performing the privacy-related processing on the collected data by at least one of: obfuscating at least a part of the collected information, and replacing at least at a part of the collected information with default information, based on a result of the comparison; and
preparing the processed data to be reported to at least one up-stream probe based on a specification and at a predetermined processing frequency; and
a probe communication module for communication of the processed data with the up-stream and the down-stream probes.

22. The topology of probes system of claim 20, wherein the super-probe is communicatively coupled with a lawful interception gateway (LIG) via an interface, and further comprises:
one or more hardware processors configured to execute a set of instructions for providing:
a LI specification handler module for:
receiving, from a law enforcement agent (LEA) through the interface, a specification for the information to be tracked and reported, the specification including information to be reported and reporting requirements, and
finalizing the specification based on privacy requirement settings to generate a finalized specification;
a LI planning and configuration module for negotiating with a law enforcement authority (LEA) about the information to be tracked, determining a scope of the tracked information to be reported based on the finalized specification, forming the LI Probe topology and configuration thereof, and for storing data related to a privacy requirement settings in one or more memory devices;
a LI activation and control module for activating the LI operation in the topology of probes;
a data collection module for collecting the LI information and diagnostics information from at least one probe in the hierarchy of probes, the diagnostics information including history data related to past privacy exceptions;
a LI information preparation module for processing the collected LI information for reporting to the LEA according to the privacy requirement settings;
a super-probe communication module for communicating with the LEA at least one probe in the hierarchy of probes; and
the memory configured to store super-probe configuration data store (IoTSPCS) and the super-probe LI context.

23. The topology of probes system of claim 22, wherein the LI planning and configuration module is configured to:
prepare probe configuration details (probe-CD) that include the privacy requirement settings;
transmit the probe-CD to other probes of the hierarchy of probes;
prepare probe delegation information (probe-DI) that stores data representing a hierarchy structure associated with the hierarchy of probes; and
transmit the probe-DI to other probes of the hierarchy of probes.

24. The topology of probes system of claim 21, wherein the host comprises at least one of:
an Internet-of-Things (IoT) device, an Internet-of-Things (IoT) gateway, an interconnect gateway, and an IoT management application.

25. The topology of probes system of claim 20, wherein the set of LI-interfaces further comprises:
a first interface for receiving specification for the information to be tracked and reported, and sending the specification response containing information about a feasibility of tracking and alternative information that can be reported;
a second interface for transmitting data to be reported; and
a third interface for transmitting bulk lawful interception data, wherein the third interface is slower than the second interface.

26. The topology of probes system of claim 25, wherein the LI planning and the configuration module is configured for determining one or more alternate probes based on the feasibility of obtaining the information to be reported according to the initial specification and satisfying the privacy requirement settings.

27. The topology of probes system of claim 26, wherein the one or more alternate probes are determined based on a finalized specification received from the LEA, after transmitting a specification response to the LEA containing information on the feasibility of obtaining the information to be reported and a set of one or more alternative information to be reported.

28. The topology of probes system of claim 20, further comprising a plug-in interface for connecting to the host; wherein the plug-in interface comprises at least one of an Application Programming Interface (API), a hardware communication interface and an inter-process communication interface.

29. The topology of probes system of claim 25, wherein the super-probe further interfaces with the lawful interception gateway via the third interface; and
wherein the hardware processor is configured to execute the set of instructions to transmit, via the third interface, bulk lawful interception data collected by the topology of probes.

30. The topology of probes system of claim 29, wherein the bulk lawful interception data comprises at least one of communication content of a suspect, and sensor data related to at least one of a location, a temperature, and a speed of the suspect.

* * * * *